United States Patent
Meir et al.

(10) Patent No.: US 12,425,283 B2
(45) Date of Patent: Sep. 23, 2025

(54) NON-LINEARITY ESTIMATION TECHNIQUES FOR DIGITAL POST DISTORTION (DPOD) IN A WIRELESS SYSTEM

(71) Applicant: QUALCOMM Incorporated, San Diego, CA (US)

(72) Inventors: Elad Meir, Ramat Gan (IL); Gideon Shlomo Kutz, Ramat Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 543 days.

(21) Appl. No.: 17/877,722

(22) Filed: Jul. 29, 2022

(65) Prior Publication Data

US 2024/0039775 A1    Feb. 1, 2024

(51) Int. Cl.
*H04L 27/26*   (2006.01)
*H04L 1/00*    (2006.01)
*H04L 5/00*    (2006.01)

(52) U.S. Cl.
CPC ........ *H04L 27/2614* (2013.01); *H04L 1/0003* (2013.01); *H04L 5/0051* (2013.01)

(58) Field of Classification Search
CPC ..... H04B 1/123; H04L 1/0003; H04L 5/0051; H04L 25/02; H04L 27/2614
See application file for complete search history.

(56) References Cited

U.S. PATENT DOCUMENTS

| 9,949,216 B2 * | 4/2018 | Majjigi | H04W 52/52 |
| 11,469,936 B2 * | 10/2022 | Hu | H04L 27/2621 |
| 11,626,894 B2 * | 4/2023 | Landis | H04B 1/0475 |
| | | | 375/262 |

(Continued)

FOREIGN PATENT DOCUMENTS

WO   WO-2021118768 A1 *   6/2021   ........... H04B 7/0413
WO   WO-2023160783 A1 *   8/2023

OTHER PUBLICATIONS

International Search Report and Written Opinion—PCT/US2023/068065—ISA/EPO—Sep. 1, 2023.

*Primary Examiner* — Eric Nowlin
(74) *Attorney, Agent, or Firm* — Holland & Hart LLP/Qualcomm

(57) ABSTRACT

This disclosure provides systems, methods and apparatus, including computer programs encoded on computer storage media, for non-linearity estimation techniques for digital post distortion (DPoD) in a wireless system. In some aspects, a first wireless device may estimate a power amplifier (PA) non-linearity associated with a second wireless device using select signaling from the second wireless device. For example, the first wireless device may use a received signal to estimate the PA non-linearity if a dynamic power range associated with the signal triggers the estimation of the PA non-linearity (such as if the dynamic power range associated with the signal satisfies, or is expected to satisfy, a threshold dynamic power range). If the dynamic power range of the signal triggers the estimation of the PA non-linearity, the first wireless device may introduce DPoD to signaling received from the second wireless device in accordance with the estimation of the PA non-linearity.

30 Claims, 8 Drawing Sheets

(56) References Cited

U.S. PATENT DOCUMENTS

| | | | | |
|---|---|---|---|---|
| 11,627,018 B2* | 4/2023 | Kutz | H04L 25/0202 | 370/252 |
| 11,711,186 B2* | 7/2023 | Kutz | H04L 5/0051 | 370/329 |
| 11,716,183 B2* | 8/2023 | Ly | H04L 5/0048 | 370/329 |
| 11,728,833 B2* | 8/2023 | Meir | H04W 72/046 | 375/262 |
| 11,728,954 B1* | 8/2023 | Kutz | H04L 25/0242 | 375/267 |
| 11,805,499 B2* | 10/2023 | Bai | H04B 7/0885 | |
| 11,870,629 B2* | 1/2024 | Kutz | H04L 5/0044 | |
| 2010/0027994 A1* | 2/2010 | Xu | H04L 5/12 | 398/43 |
| 2012/0300878 A1* | 11/2012 | Cai | H04B 1/0475 | 375/296 |
| 2015/0087351 A1* | 3/2015 | Majjigi | H04W 52/52 | 455/522 |
| 2019/0181923 A1* | 6/2019 | Nammi | H04B 17/30 | |
| 2019/0190552 A1* | 6/2019 | Sagi | H04L 25/0226 | |
| 2021/0185669 A1* | 6/2021 | Bai | H04B 7/0667 | |
| 2021/0281460 A1* | 9/2021 | Hu | H04L 27/2614 | |
| 2021/0344367 A1* | 11/2021 | Wolf | H04W 8/24 | |
| 2022/0038229 A1 | 2/2022 | Levy et al. | | |
| 2022/0085936 A1* | 3/2022 | Ly | H04L 5/0051 | |
| 2022/0095142 A1 | 3/2022 | Landis et al. | | |
| 2022/0368584 A1* | 11/2022 | Kutz | H04L 27/3411 | |
| 2023/0012494 A1* | 1/2023 | Landis | H04L 27/38 | |
| 2023/0016303 A1* | 1/2023 | Kutz | H04L 27/2614 | |
| 2023/0047906 A1* | 2/2023 | Cha | H04L 27/262 | |
| 2023/0163915 A1* | 5/2023 | Shibaike | H04J 13/0062 | 370/329 |
| 2023/0208457 A1* | 6/2023 | Meir | H04L 5/0023 | 375/262 |
| 2023/0232342 A1* | 7/2023 | Gutman | H04W 52/325 | 370/318 |
| 2023/0283443 A1* | 9/2023 | Kutz | H04L 25/0212 | 375/267 |
| 2024/0039775 A1* | 2/2024 | Meir | H04L 5/0051 | |
| 2025/0112599 A1* | 4/2025 | Tan | H03F 3/195 | |

* cited by examiner

NON-LINEARITY ESTIMATION TECHNIQUES FOR DIGITAL POST DISTORTION (DPOD) IN A WIRELESS SYSTEM

TECHNICAL FIELD

This disclosure relates to wireless communications, including non-linearity estimation techniques for digital post distortion (DPoD) in a wireless system.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a wireless device. The method may include receiving, during a first slot, a signal associated with a dynamic power range, where the dynamic power range triggers an estimation of a power amplifier (PA) non-linearity using the signal, and receiving, during a second slot, signaling associated with one or more messages, where the estimation of the PA non-linearity is associated with an application of digital post distortion (DPoD) to the signaling.

Another innovative aspect of the subject matter described in this disclosure can be implemented in an apparatus for wireless communications at a wireless device. The apparatus may include one or more interfaces and a processing system. The one or more interfaces may be configured to obtain, during a first slot, a signal associated with a dynamic power range, where the dynamic power range triggers an estimation of a PA non-linearity using the signal, and obtain, during a second slot, signaling associated with one or more messages, where the estimation of the PA non-linearity is associated with an application of DPoD to the signaling.

Another innovative aspect of the subject matter described in this disclosure can be implemented in an apparatus for wireless communications at a wireless device. The apparatus may include a processor, memory coupled with the processor, and instructions stored in the memory. The instructions may be executable by the processor to cause the apparatus to receive, during a first slot, a signal associated with a dynamic power range, where the dynamic power range triggers an estimation of a PA non-linearity using the signal, and receive, during a second slot, signaling associated with one or more messages, where the estimation of the PA non-linearity is associated with an application of DPoD to the signaling.

Another innovative aspect of the subject matter described in this disclosure can be implemented in another apparatus for wireless communications at a wireless device. The apparatus may include means for receiving, during a first slot, a signal associated with a dynamic power range, where the dynamic power range triggers an estimation of a PA non-linearity using the signal, and means for receiving, during a second slot, signaling associated with one or more messages, where the estimation of the PA non-linearity is associated with an application of DPoD to the signaling.

Another innovative aspect of the subject matter described in this disclosure can be implemented in a non-transitory computer-readable medium storing code for wireless communications at a wireless device. The code may include instructions executable by a processor to receive, during a first slot, a signal associated with a dynamic power range, where the dynamic power range triggers an estimation of a PA non-linearity using the signal, and receive, during a second slot, signaling associated with one or more messages, where the estimation of the PA non-linearity is associated with an application of DPoD to the signaling.

Another innovative aspect of the subject matter described in this disclosure can be implemented in a method for wireless communications at a wireless device. The method may include transmitting, during a first slot, a dedicated pilot signal associated with a dynamic power range, where the dynamic power range indicates a trigger for an estimation of a PA non-linearity, and transmitting, during a second slot, signaling associated with one or more messages using a PA operating point, where the PA operating point is associated with the dedicated pilot signal indicating the trigger for the estimation of the PA non-linearity.

Another innovative aspect of the subject matter described in this disclosure can be implemented in an apparatus for wireless communications at a wireless device. The apparatus may include one or more interfaces and a processing system. The one or more interfaces may be configured to output, during a first slot, a dedicated pilot signal associated with a dynamic power range, where the dynamic power range indicates a trigger for an estimation of a PA non-linearity, and output, during a second slot, signaling associated with one or more messages using a PA operating point, where the PA operating point is associated with the dedicated pilot signal indicating the trigger for the estimation of the PA non-linearity.

Another innovative aspect of the subject matter described in this disclosure can be implemented in an apparatus for wireless communications at a wireless device. The apparatus may include a processor, memory coupled with the processor, and instructions stored in the memory. The instructions may be executable by the processor to cause the apparatus to transmit, during a first slot, a dedicated pilot signal associated with a dynamic power range, where the dynamic power range indicates a trigger for an estimation of a PA non-linearity, and transmit, during a second slot, signaling associated with one or more messages using a PA operating point, where the PA operating point is associated with the dedicated pilot signal indicating the trigger for the estimation of the PA non-linearity.

Another innovative aspect of the subject matter described in this disclosure can be implemented in another apparatus for wireless communications at a wireless device. The apparatus may include means for transmitting, during a first slot, a dedicated pilot signal associated with a dynamic power range, where the dynamic power range indicates a trigger for an estimation of a PA non-linearity, and means for transmitting, during a second slot, signaling associated with one or more messages using a PA operating point, where the PA operating point is associated with the dedicated pilot signal indicating the trigger for the estimation of the PA non-linearity.

Another innovative aspect of the subject matter described in this disclosure can be implemented in a non-transitory computer-readable medium storing code for wireless communications at a wireless device. The code may include instructions executable by a processor to transmit, during a first slot, a dedicated pilot signal associated with a dynamic power range, where the dynamic power range indicates a trigger for an estimation of a PA non-linearity, and transmit, during a second slot, signaling associated with one or more messages using a PA operating point, where the PA operating point is associated with the dedicated pilot signal indicating the trigger for the estimation of the PA non-linearity.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
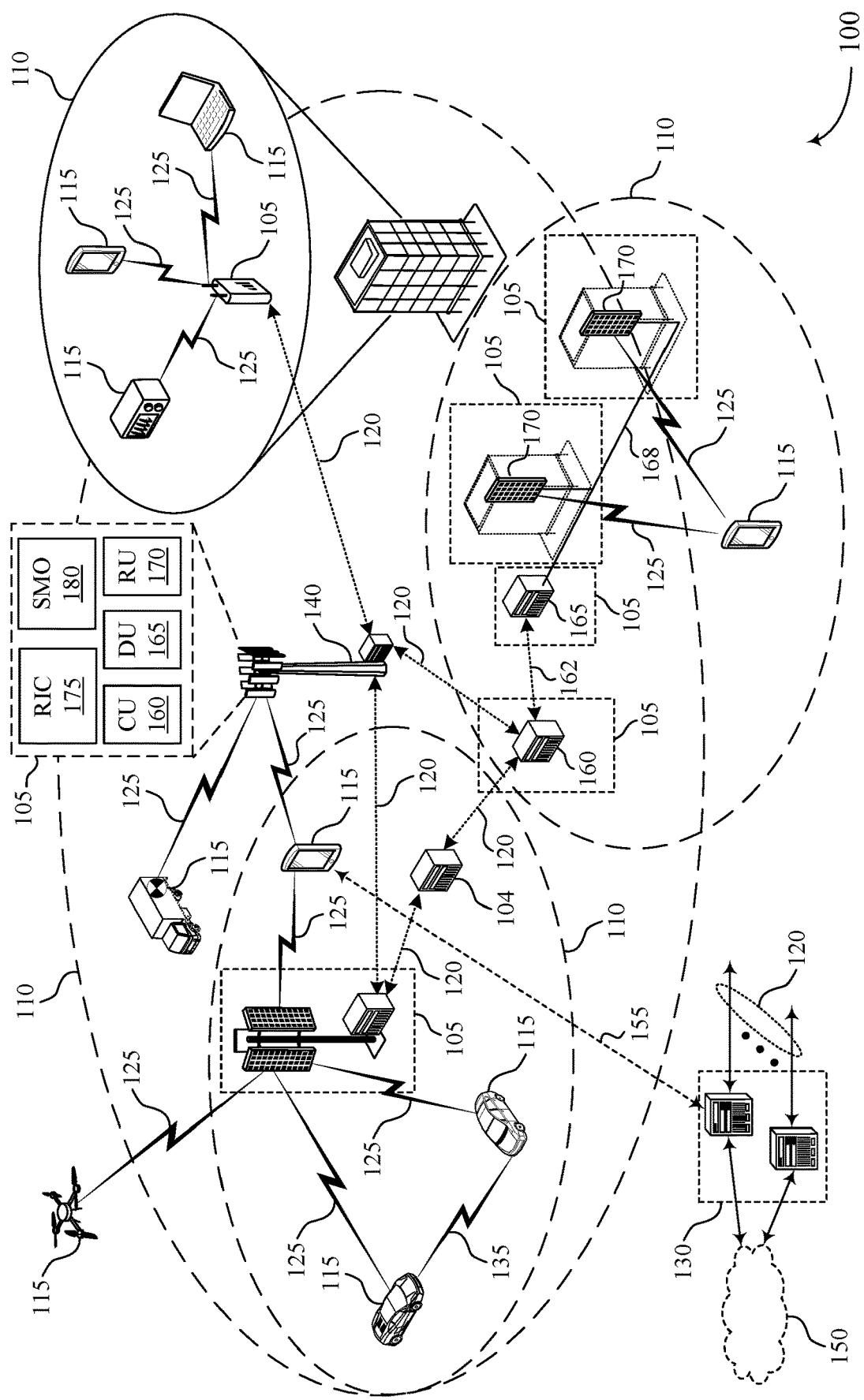
FIG. 1 shows an example wireless communications system that supports non-linearity estimation techniques for digital post distortion (DPoD) in a wireless system.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G) or fifth generation (5G), or further implementations thereof, technology.

In some wireless communications systems, a transmitter may transmit wireless signaling and, depending on a transmit power, a power amplifier (PA) of the transmitter may introduce a non-linearity to the wireless signaling. For example, the PA of the transmitter may be associated with two regions, including a mostly linear region and a non-linear region, and operation in one region or the other may be associated with the transmit power used by the transmitter. The transmitter may operate in the mostly linear region of the PA if using a first, relatively lower transmit power and may operate in the non-linear region of the PA if using a second, relatively higher transmit power. In some aspects, a receiver may apply digital post distortion (DPoD) to compensate for the PA non-linearities introduced at the transmitter. As such, an application of DPoD at the receiver may enable the transmitter to move farther into or toward the non-linear region of the PA (and likewise enable the transmitter to use a greater transmit power). To facilitate accurate DPoD, the receiver may generate, estimate, or otherwise calculate a PA model associated with the PA of the transmitter and may apply DPoD in accordance with the PA model. Some systems may lack dedicated signaling that the receiver may use to accurately estimate the PA model (such as to accurately estimate a non-linearity associated with the PA of the transmitter), which may hinder an achievable DPoD accuracy at the receiver. For example, an accuracy of a PA model estimation (which may influence the accuracy of the corresponding DPoD) may depend on a dynamic range of measured signaling at the receiver, and some systems may lack dedicated pilots or other identifiable signals that span a sufficient dynamic range for accurate PA model estimation.

In some implementations, a receiver may estimate a PA model (such as a non-linearity of a PA) of a transmitter in accordance with measuring select signaling from the transmitter and may apply DPoD to receive messages from the transmitter in accordance with the estimated PA model. In some aspects, such select signaling from the transmitter may include a signal associated with a dynamic range (such as a dynamic power range) that triggers an estimation of the PA non-linearity using the signal. In other words, if the signal is associated with a dynamic range that satisfies (or that likely satisfies) a threshold dynamic range, the receiver may use the signal to estimate the PA non-linearity of the transmitter. In some implementations, the signal may be a demodulation reference signal (DMRS) and the receiver may use the DMRS for PA non-linearity estimation if a peak-to-average-power ratio (PAPR) of the DMRS satisfies a threshold PAPR (as a PAPR may be associated with a dynamic range).

Additionally, or alternatively, the signal may be a data message and the receiver may use the data message for PA non-linearity estimation if the data message spans a threshold time duration, such as an entirety of a slot (as spanning an entirety of a slot may increase a likelihood that the data message was transmitted using various, diverse transmit powers at the transmitter). Additionally, or alternatively, the receiver and the transmitter may support a dedicated pilot signal associated with (such as specifically associated with or dedicated for) PA non-linearity estimation. As such, the receiver may use any one or more of a DMRS, a data message, or a dedicated pilot signal received during a first slot to estimate a PA non-linearity and may apply DPoD to one or more messages received during a second slot in accordance with the estimated PA non-linearity.

Particular implementations of the subject matter described in this disclosure can be implemented to realize one or more of the following potential advantages. For example, as a result of supporting a selection criterion for which signals the receiver uses to estimate the PA non-linearity of the transmitter, the receiver may measure, calculate, or generate a more accurate model of the PA used by the transmitter and more accurately apply DPoD to received messages. As such, the transmitter may use a greater transmit power, achieve a higher signal-to-noise ratio (SNR), and achieve higher data rates. Further, in implementations in which the selection criterion is associated with a dynamic range of DMRSs or data messages, the receiver may obtain the more accurate model of the PA without additional signaling, which may reduce system overhead and increase compatibility among various types of wireless devices. In implementations in which the selection criterion is associated with a dedicated pilot signal that is transmitted and measured for the purpose of estimating the PA non-linearity, the transmitter and the receiver may increase the likelihood that the receiver obtains an accurate estimation of the PA non-linearity of the transmitter in accordance with the dedicated pilot signal being configured and transmitted for that purpose. In accordance with a relatively lower overhead or a relatively higher accuracy PA model estimation, or both, the transmitter and the receiver may further achieve greater link reliability, greater spectral efficiency, and greater system capacity, among other benefits.

FIG. 1 shows an example wireless communications system 100 that supports non-linearity estimation techniques for DPoD in a wireless system. The wireless communications system 100 may include one or more network entities 105, one or more UEs 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as an RF access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, standalone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof. An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending on which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support non-linearity estimation techniques for DPoD in a wireless system as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

Signal waveforms transmitted via a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, in some implementations, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHz.

The wireless communications system 100 also may operate using a super high frequency (SHF) region, which may be in the range of 3 GHz to 30 GHz, also known as the centimeter band, or using an extremely high frequency (EHF) region of the spectrum (such as from 30 GHz to 300 GHz), also known as the millimeter band. In some implementations, the wireless communications system 100 may support millimeter wave (mmW) communications between the UEs 115 and the network entities 105 (such as BSs 140, RUs 170), and EHF antennas of the respective devices may be smaller and more closely spaced than UHF antennas. In some implementations, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be based on a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

In some wireless communications systems, such as the wireless communications system 100, two or more wireless devices (such as UEs 115 or network entities 105, or any combination thereof) may exchange over-the-air (OTA) signaling. A transmitter (such as a UE 115 or a network entity 105) may transmit one or more signals or messages using an RF chain, which may include various components (such as various hardware components) including a PA. A PA, such as an RF PA, may be a type of electronic amplifier that converts a relatively lower power RF signal into a relatively higher power RF signal. In some aspects, an RF PA may be coupled with, and control, an antenna of a transmitter.

In some deployments, a PA may be associated with at least two regions of operation, including a largely linear region (such that the PA is primarily or mostly linear in that region) and a non-linear region, where operation in one region or the other is associated with a transmit power. For example, relatively lower transmit powers may be associated with operation in the largely linear region of a PA and relatively higher transmit powers may be associated with operation in the non-linear region of a PA. Linearity of a PA may refer to how an output signal strength varies in direct proportion to an input signal strength, while non-linearity of a PA may refer to how an output signal strength does not vary in direct proportion to an input signal strength. For example, if operating in a non-linear region of a PA, a transmitter may increase input signal strength at a first rate and an actual output signal strength may increase at a second rate. Further, non-linear behavior of a PA may cause signal degradation in the form of output signal distortions, such as harmonic compression, gain compression, inter-modulation distortion, amplitude distortion, phase distortion, and adjacent channel interference, among other examples. Thus, while using a relatively higher transmit power may increase an SNR and a data rate, a transmitter may balance a tradeoff between higher transmit power and output signal distortion, along with industry- or specification-specific constraints or guidelines.

In some systems, a receiver (such as a UE 115 or a network entity 105) may apply or introduce DPoD (which may be equivalently referred to as digital linearization) to account or compensate for non-linearities that are present in a signal from a transmitter. For example, if a transmitter enters a non-linear region of a PA when transmitting a signal to a receiver, the receiver may compensate for corresponding distortions in accordance with implementing a DPoD technique. In other words, DPoD may be a technique that allows a receiver to compensate for the PA non-linearities and achieve greater performance (such as achieve a greater likelihood of successful decoding). To implement a DPoD technique, a receiver may measure, identify, calculate, estimate, or extract a model (such as a mathematical model or a mathematical description) of a non-linear behavior of a transmitter in accordance with a set of measurements and may apply an inverse of the model to a received signal (such as a signal received from the transmitter for which the receiver estimated the non-linear behavior) using a digital processing technique. Some systems, however, may lack a configured or identifiable approach for obtaining a model of the non-linear behavior of a transmitter (where such a model may be referred to herein as a PA model or a DPoD model). As such, a receiver may be unaware of how to obtain an accurate model of the non-linear behavior, which may result in reception errors or failures if an obtained model is inaccurate.

Accordingly, in some implementations, a receiver may implement a selection criterion according to which the receiver may use select signals from a transmitter to measure, calculate, estimate, identify, or otherwise determine a non-linearity of a PA of the transmitter. In some implementations, the selection criterion may be associated with a dynamic range (such as a dynamic power range) of a signal, where one or more dynamic ranges may trigger use of the signal for PA non-linearity estimation and some other dynamic ranges may indicate that the signal is not to be used for PA non-linearity estimation. For example, if the receiver measures, calculates, identifies, or otherwise determines that a signal has or likely has a dynamic range that satisfies (such as exceeds or is equal to) a threshold dynamic range, the receiver may use the signal to estimate a PA non-linearity of a corresponding transmitter. Such a signal may include any one or more of a DMRS, a data message, or a dedicated pilot signal and the receiver may identify or determine that a dynamic range of the signal triggers PA non-linearity estimation in accordance with a measurement, a sequence detection, or a signaling exchange between the transmitter and the receiver.

Figure 2:
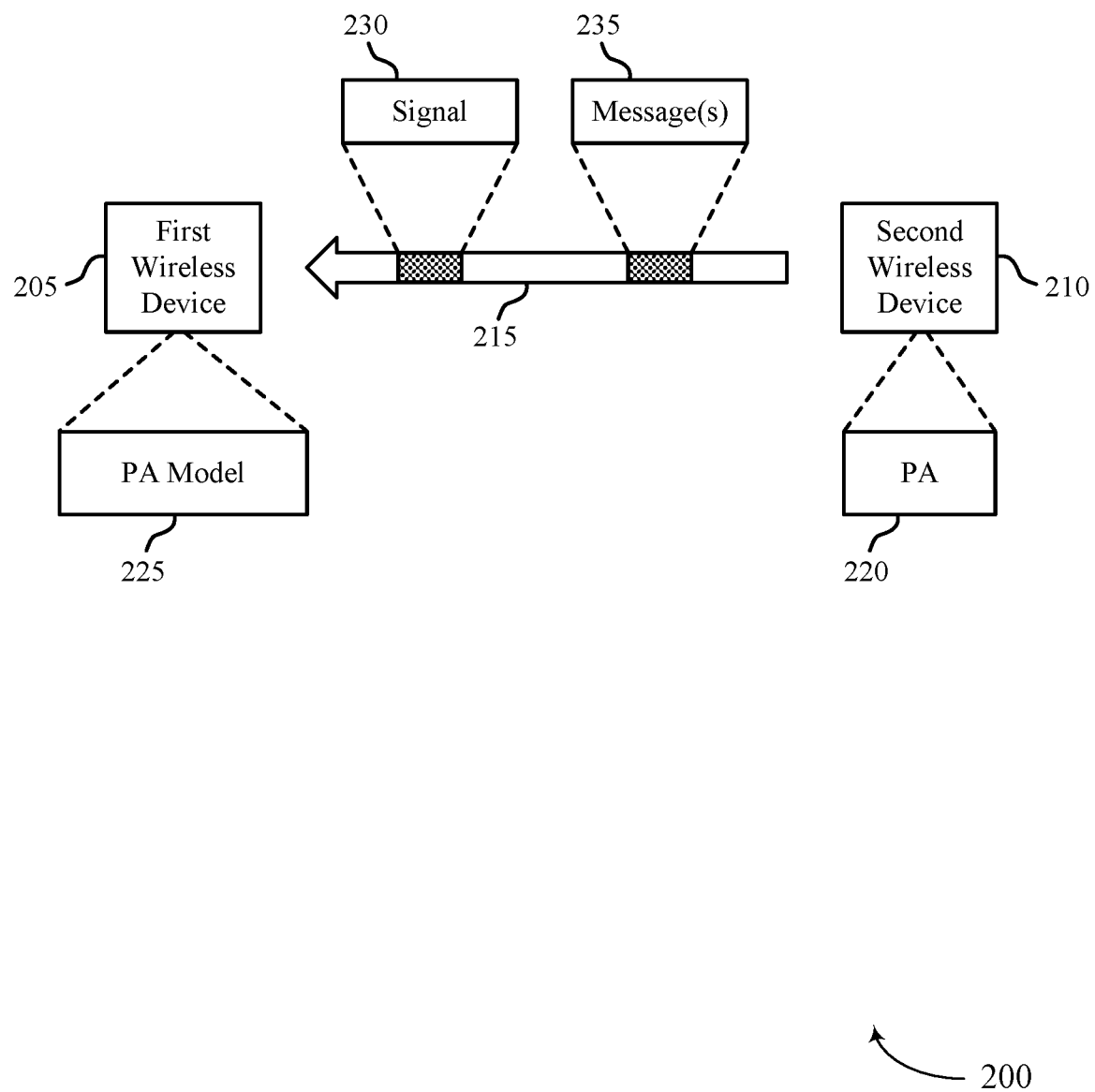
FIG. 2 shows an example signaling diagram that supports non-linearity estimation techniques for DPoD in a wireless system.

FIG. 2 shows an example signaling diagram 200 that supports non-linearity estimation techniques for DPoD in a wireless system. The signaling diagram 200 may implement aspects of wireless communications system 100. For example, the signaling diagram 200 illustrates communication between a first wireless device 205 and a second wireless device 210 via a communication link 215. The first wireless device 205 may be an example of a UE 115 or a network entity 105 as illustrated by and described with reference to FIG. 1. The second wireless device 210 may be an example of a UE 115 or a network entity 105 as illustrated by and described with reference to FIG. 1. Accordingly, the communication link 215 may be an example of an uplink, a downlink, a sidelink, or backhaul link. In some implementations, the first wireless device 205 or the second wireless device 210, or both, may support a selection criterion associated with identifying which signaling from a transmitter is suitable for an estimation of a PA non-linearity of the transmitter.

For example, as illustrated by the signaling diagram 200, the first wireless device 205 may function as a receiver and the second wireless device 210 may function as a transmitter. As such, the second wireless device 210 may use a PA 220 (such as an RF PA) to transmit signaling or messaging to the first wireless device 205 via OTA signaling, where the PA 220 may be associated a non-linear behavior at some operating points (such as at some transmit powers). The first wireless device 205 may apply a DPoD technique to linearize signaling received from the second wireless device 210 and may estimate, calculate, extract, or otherwise determine a PA model 225 (which may be equivalently referred to or understood as a model of the non-linear behavior of the second wireless device 210).

In some aspects, a system or specification may be associated with one or more emission constraints that limit a permissible or allowable level of PA non-linearity for communication between the first wireless device 205 and the second wireless device 210. In some implementations, however, application of DPoD in a way that is system or specification compliant may increase performance of the first wireless device 205 and the second wireless device 210, which may increase a likelihood of adoption of DPoD techniques or enable an adoption of DPoD in a phased approach. For example, signaling sent using PAs operating at a specification-compliant operating point may be somewhat compressed or distorted such that DPoD techniques may provide performance benefits across various specification-compliant deployments.

For example, a first performance of a non-DPoD capable receiver if a transmitter is operating in accordance with a emission constraint (such as an error vector magnitude (EVM) constraint, such as an EVM constraint of 29 dB for 256 quadrature amplitude modulation (QAM)) may be associated with a first relationship between megabits per second (mbps) and SNR and a second performance of a DPoD capable receiver if a transmitter is operating in accordance with the same emission constraint may be associated with a second relationship between mbps and SNR, where the second performance may be greater than the first performance (such as by approximately 1-2 dBs). In other words, DPoD may gain approximately 1-2 dBs in performance (such as in SNR) even if a transmitter adheres to an emission constraint. An accuracy of PA model estimation may influence the achievable gain of DPoD and, accordingly, one of the challenges in applying DPoD is accurately estimating the PA model 225. For example, for proper PA modeling (such as to accurately estimate the PA model 225), the first wireless device 205 may use pilots that span a data dynamic range (such as a dynamic power range associated with data messaging).

Some systems, however, may lack mechanisms associated with making such pilot signals available or identifiable. For example, if a DPoD capable receiver uses a PA estimation that is associated with transmitted DMRSs each slot, the DPoD receiver may experience worse performance than if the receiver refrained from performing DPoD altogether. For example, if the first wireless device 205 estimates a PA model per slot using a DMRS received in that slot, the first wireless device 205 may experience lower SNR values or lower throughput, as compared to the first performance and the second performance, for a majority of mbps values. Thus, to effectively apply the PA model 225 to received signaling or messaging, the first wireless device 205 may implement a technique associated with obtaining a sufficiently accurate PA model 225, which may involve being selective or deliberate relating to which signaling the first wireless device 205 uses to estimate the PA model 225.

In some implementations, for example, the first wireless device 205 may receive a signal 230 from the second wireless device 210 and the first wireless device 205 may measure, calculate, identify, or otherwise determine whether a dynamic power range associated with the signal 230 triggers an estimation of the non-linearity of the PA 220 for the PA model 225 using the signal 230. In such implementations, if the dynamic power range associated with the signal 230 satisfies a threshold dynamic power range, the first wireless device 205 may use (such as measure) the signal 230 to estimate the non-linearity of the PA 220. The first wireless device 205 may measure, calculate, identify, or otherwise determine whether the dynamic power range associated with the signal 230 triggers the estimation of the non-linearity of the PA 220 in various ways that depend on a type of the signal 230. For example, if the signal 230 is a DMRS, the first wireless device 205 may use a PAPR of the DMRS. If the signal 230 is a data message, the first wireless device 205 may expect the data message to satisfy the threshold dynamic power range if the data message spans a threshold time duration, such as an entirety of a slot. If the signal 230 is a dedicated pilot signal, the first wireless device 205 may expect the dedicated pilot signal to satisfy the threshold dynamic power range in accordance with a configuration of the dedicated pilot signal. Additional details relating to how the first wireless device 205 identifies or determines whether to estimate a non-linearity of the PA 220 are illustrated by and described with reference to FIG. 3.

In accordance with estimating the PA model 225 using the signal 230, the first wireless device 205 may receive one or more messages 235 (such as one or more data messages) in accordance with a DPoD associated with the PA model 225. For example, the first wireless device 205 may apply an inverse of the PA model 225 to apply or introduce DPoD to the one or more messages 235. In some aspects, the first wireless device 205 may receive, obtain, or extract information from the one or more messages 235 in accordance with introducing or applying the DPoD associated with the PA model 225 (such as associated with the estimation of the PA non-linearity) to the signaling. In some implementations, the DPoD may be enabled in accordance with the estimation of the PA non-linearity and otherwise disabled. For example, the first wireless device 205 may refrain from applying DPoD prior to estimating the PA model 225 using the select signal 230 and may apply DPoD in accordance with estimating the PA model 225 using the select signal 230.

Further, a level, amount, or impact of PA non-linearity may increase with transmit power. For example, a first, relatively smaller transmit power may be associated with a relatively smaller PA non-linearity and a second, relatively greater transmit power may be associated with a relatively larger PA non-linearity. A gain of a DPoD technique may be associated with (such as positively correlated with) an amount of PA non-linearity. For example, a gain of a DPoD technique may be relatively larger when received signaling is associated with a relatively larger PA non-linearity. As such, the first wireless device 205 may achieve relatively larger gains from a DPoD technique if the second wireless device 210 uses relatively larger transmit powers that are associated with relatively larger PA non-linearities.

Some systems or specifications, however, may limit a transmit power or an amount of non-linearity that is allowed. For example, some systems or specifications may implement in-band or out-of-band emission constraints, such as an EVM constraint or an adjacent channel leakage power ratio (ACLR) constraint. Accordingly, to achieve a largest gain from a DPoD technique, such systems or specifications may lift such constraints in some conditions (such as if a condition is satisfied, such as if the second wireless device 210 measures, identifies, or determines that a user is outside a threshold range from the second wireless device 210 or if other devices in a system would likely not be hindered by resulting interference). Lifting such in-band or out-of-band constraints may enable the second wireless device 210 to transmit using a more compressed PA operating point and thus achieve a greater output power, a greater SNR, and higher data rates of the communication link 215. Further, while described in the context of a single PA model 225 herein, the first wireless device 205 may generate one or more PA models 225. In some aspects, a quantity of PA models 225 that the first wireless device 205 may generate may be associated with (such as positively correlated with) a quantity of transmit antennas (such as a quantity of transmit antennas of the second wireless device 210).

Figure 3:
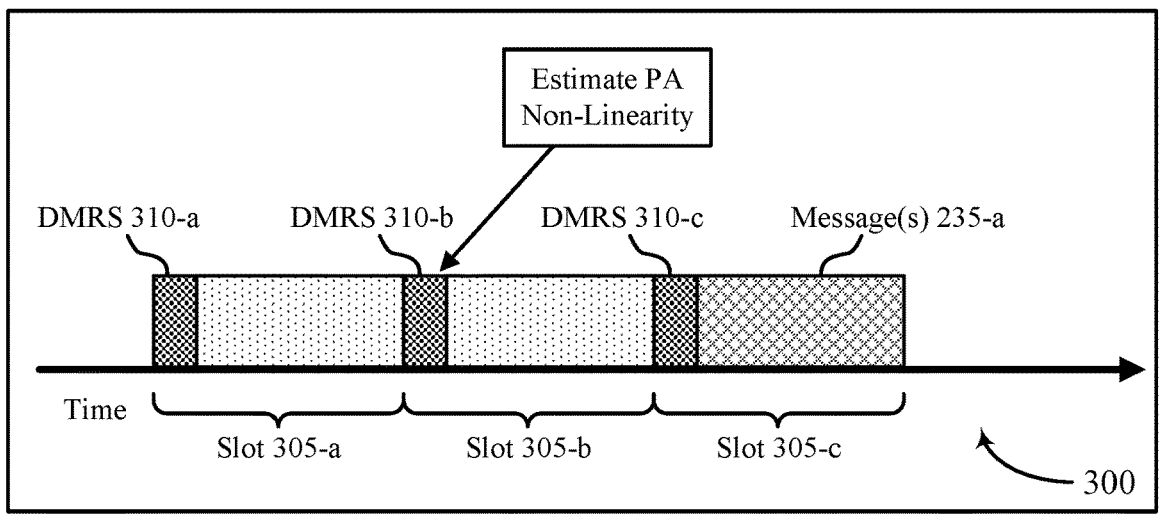
FIG. 3 shows example power amplifier (PA) non-linearity estimations that support non-linearity estimation techniques for DPoD in a wireless system.
Figure 3:
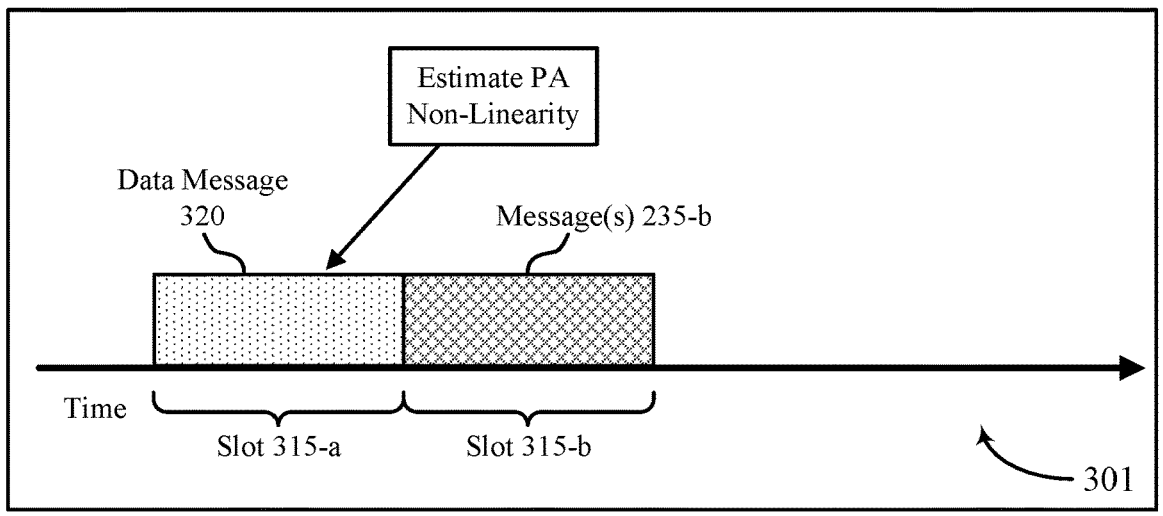
Figure 3:
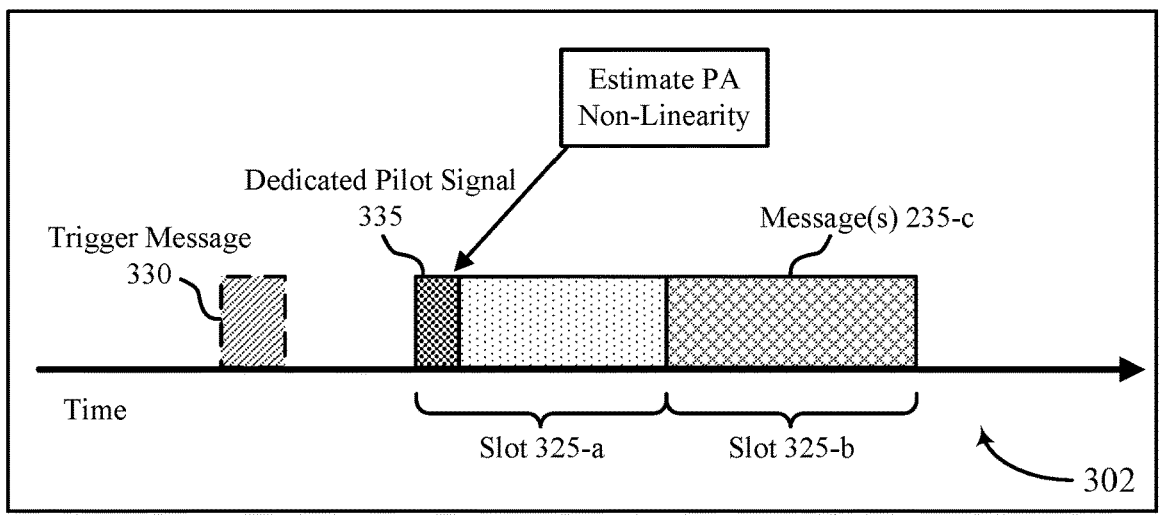

FIG. 3 shows example PA non-linearity estimations 300, 301, and 302 that support non-linearity estimation techniques for DPoD in a wireless system. The PA non-linearity estimations 300, 301, and 302 may implement or be implemented to realize aspects of the wireless communications system 100 or the signaling diagram 200. For example, a first wireless device 205 and a second wireless device 210 may communicate the signaling illustrated by the PA non-linearity estimations 300, 301, and 302. The first wireless device 205 and the second wireless device 210 may be examples of the first wireless device 205 and the second wireless device 210, respectively, as illustrated by and described with reference to FIG. 2. In some implementations, the first wireless device 205 may support a selection criterion associated with which signaling the first wireless device 205 may use to estimate a PA non-linearity of a PA 220 (such as a PA 220 as illustrated by and described with reference to FIG. 2) of the second wireless device 210.

In accordance with the PA non-linearity estimation 300, the first wireless device 205 may selectively use one or more DMRSs 310 across one or more slots 305, where a DMRS 310 may generally refer to any one or more of a DMRS 310-*a*, a DMRS 310-*b*, or a DMRS 310-*c* and a slot 305 may generally refer to any one or more of a slot 305-*a*, a slot 305-*b*, or a slot 305-*c*. In some aspects, the first wireless device 205 may selectively use a DMRS 310 to estimate a PA non-linearity in accordance with whether the DMRS 310 is associated with a PAPR that satisfies a threshold PAPR. In other words, the first wireless device 205 may estimate a PA model 225 using selected DMRS sequences with sufficiently high enough PAPR. The first wireless device 205 may use PAPR as a metric to select which DMRSs 310 to use for PA model estimation as a DMRS 310 associated with a relatively higher PAPR value may have a relatively greater likelihood of spanning the dynamic power range of data messages.

For example, a DMRS pattern may change across different slots 305 and some DMRS sequences may have a PAPR that is too low for PA model estimation while some other DMRS sequences may have a PAPR that is sufficiently high for PA model estimation. As such, an adaptation of the PA model 225 every slot 305 may result in poor estimation and performance for a set of slots 305 (such as for most of the slots 305). Accordingly, in some implementations, the first wireless device 205 may measure, calculate, or assume a PAPR per DMRS symbol and may select, for PA model estimation, DMRS symbols or slots that are suitable for accurate PA model estimation (such as DMRS symbols or slots that are associated with a PAPR that satisfies a threshold PAPR).

In the example of the PA non-linearity estimation 300, the first wireless device 205 may receive multiple DMRSs 310 across multiple slots 305 and may select to use the DMRS 310-*b* to estimate a PA non-linearity in accordance with the DMRS 310-*b* being associated with a PAPR that triggers the estimation of the PA non-linearity (such that a PAPR of the DMRS 310-*b* satisfies a threshold PAPR). In some implementations, the first wireless device 205 may identify, generate, or otherwise determine a sequence of the DMRS 310-*b* and may calculate the PAPR associated with the DMRS 310-*b* using the sequence. Additionally, or alternatively, the first wireless device 205 may measure the PAPR associated with the DMRS 310-*b* via one or more antennas of the first wireless device 205.

The DMRS 310-*b* may be associated with one or multiple DMRS symbols. In implementations in which the DMRS 310-*b* is associated with multiple DMRS symbols, the first wireless device 205 may estimate one PA model 225 for all of the DMRS symbols for each data stream. In other words, if there are multiple DMRSs symbols in a slot for a given data stream, the first wireless device 205 may use each if not all of the DMRS symbols to estimate the PA model 225, which may provide a result that is at least as accurate as if the first wireless device 205 estimates the PA model 225 using the DMRS symbol associated with the highest PAPR of the multiple DMRS symbols (if the multiple DMRS symbols are associated with different PAPRs). Different data streams may be associated with different antennas of the first wireless device 205. As such, in implementations in which the DMRS 310-*b* is associated with multiple DMRS symbols and in which the first wireless device 205 uses multiple antennas, the first wireless device 205 may estimate a respective PA model 225 for all of the DMRS symbols for each data stream (such as on a per data stream basis), where different data streams correspond to different antennas, different antenna panels, different sets of antenna ports, different sets of antenna elements, different spatial layers, or any combination thereof.

In some implementations, the first wireless device 205 may refrain from using the DMRS 310-*a* for estimating the PA non-linearity in accordance with the DMRS 310-*a* being associated with a PAPR that fails to trigger the estimation of the PA non-linearity. For example, a PAPR of the DMRS 310-*a* may fail to satisfy the threshold PAPR. As such, prior to the DMRS 310-*b* (which may be associated with a proper DMRS symbol for non-linearity estimation), the first wireless device 205 may refrain from applying DPoD on the receiver side and, once the DMRS 310-*b* is available (such as received), the first wireless device 205 may enable DPoD. The first wireless device 205 may use the estimation of the PA non-linearity to obtain the PA model 225 and may apply the non-linearity estimation for a next or subsequent set of slots 305. In other words, the first wireless device 205 may estimate a PA non-linearity using selected DMRS symbols and may use the estimations for a remainder of slots 305.

For example, the first wireless device may refrain from applying or introducing DPoD during the slot 305-*a*, but may apply or introduce DPoD in one or both of the slot 305-*b* and the slot 305-*c*. As such, the first wireless device 205 may apply or introduce DPoD to receive one or more messages 235-*a*, which may be examples of the one or more messages 235 as illustrated by and described with reference to FIG. 2. In some implementations, the first wireless device 205 may request a higher modulation and coding scheme (MCS) in accordance with enabling DPoD on the receiver side (such as in accordance with achieving greater receiver capabilities once an accurate PA model 225 is obtained).

In the example of the PA non-linearity estimation 301, the first wireless device 205 may estimate a PA model 225 using demodulated data and may apply the estimation for a next or subsequent set of slots 315, where a slot 315 may generally refer to any one or more of a slot 315-*a* and a slot 315-*b*. In some implementations, the first wireless device 205 may expect or assume that data symbols of a whole or entire slot may span a dynamic power range with a relatively high probability and, as such, the first wireless device 205 may selectively choose which data messages to use to estimate a PA non-linearity in accordance with which data messages span a whole or entire slot. For example, the first wireless device 205 may select to use a data message 320 and may identify or determine that the data message 320 triggers the estimation of the PA non-linearity in accordance with the data message spanning an entirety of the slot 315-*a* (or otherwise spanning a threshold time duration). In accordance with detecting that the data message 320 triggers the estimation of the PA non-linearity (such as spans an entirety of a slot or a threshold time duration), the first wireless device 205 may re-encode the data message 320 and use the re-encoded data message 320 as pilots with which to estimate the PA model 225.

For example, the first wireless device 205 may decode the data message 320 to obtain information conveyed via the data message 320, may encode the data message 320 as a pilot signal in accordance with identifying or determining that the data message 320 triggers the estimation of the PA non-linearity, and may estimate the PA non-linearity using the pilot signal. As such, the first wireless device 205 may apply or introduce DPoD associated with the estimated PA non-linearity during the slot 315-*b* (and potentially additional subsequent slots) to receive and decode one or more messages 235-*b*, which may be examples of the one or more messages 235 as illustrated by and described with reference to FIG. 2.

In the example of the PA non-linearity estimation 302, the first wireless device 205 and the second wireless device 210 may support a pilot signal that is dedicated or configured for PA model estimation. As such, the first wireless device 205 may transmit a trigger message 330 (such as a request) for a dedicated pilot signal 335 for PA model estimation. In some implementations, the dedicated pilot signal 335 may be associated with a pilot waveform that spans the dynamic power range. The dedicated pilot signal 335 may be associated with, the same as, or similar to a DMRS that is selected for slots or symbols associated with a relatively high PAPR. In other words, the first wireless device 205 and the second wireless device 210 may support a signaling mechanism associated with transmission of a dedicated pilot signal sequence associated with a relatively high PAPR on-demand or in response to one or more other triggers or conditions being satisfied.

For example, the second wireless device 210 may transmit the dedicated pilot signal 335 during a slot 325-*a* due to a receiver request (such as transmission of the trigger message 330 by the first wireless device 205) or a PA model change. In some implementations, the PA model change may be associated with a change in a constellation associated with a modulation scheme at either or both of the first wireless device 205 or the second wireless device 210. In some aspects, such a constellation change may be associated with or due to link adaptation decisions and may impact the PA 220 of the second wireless device 210 as lower constellations may be compressed more aggressively by the second wireless device 210. Additionally, or alternatively, a PA model 220 may change over time for other environmental or operational reasons. For example, a PA model 220 may change due to a change in temperature at either or both of the first wireless device 205 or the second wireless device 210. In implementations in which the second wireless device 210 transmits the dedicated pilot signal 335 due to a PA model change, the second wireless device 210 may transmit, to the first wireless device 205, an indication that the dedicated pilot signal 335 is to be transmitted (and an indication of which time or frequency resources the dedicated pilot signal 335 may occupy). The second wireless device 210 may include an indication of a reason for the transmission of the dedicated pilot signal 335 (such as a reason associated with why the PA 220 of the second wireless device 210 has changed). Additionally, or alternatively, the second wireless device 210 may transmit the dedicated pilot signal 335 periodically or semi-persistently.

The first wireless device 205 may receive the dedicated pilot signal 335, use the dedicated pilot signal to estimate the PA non-linearity, and may apply or introduce DPoD to signaling or messaging received during one or more next or subsequent slots. For example, the first wireless device 205 may obtain or estimate a PA model 225 in accordance with estimating the PA non-linearity using the dedicated pilot signal 335 and may use the PA model 225 (such as an inverse of the PA model 225) to apply or introduce DPoD associated with the estimated PA non-linearity during a slot 325-*b* (and potentially additional subsequent slots) to receive and decode one or more messages 235-*c*, which may be examples of the one or more messages 235 as illustrated by and described with reference to FIG. 2.

Figure 4:
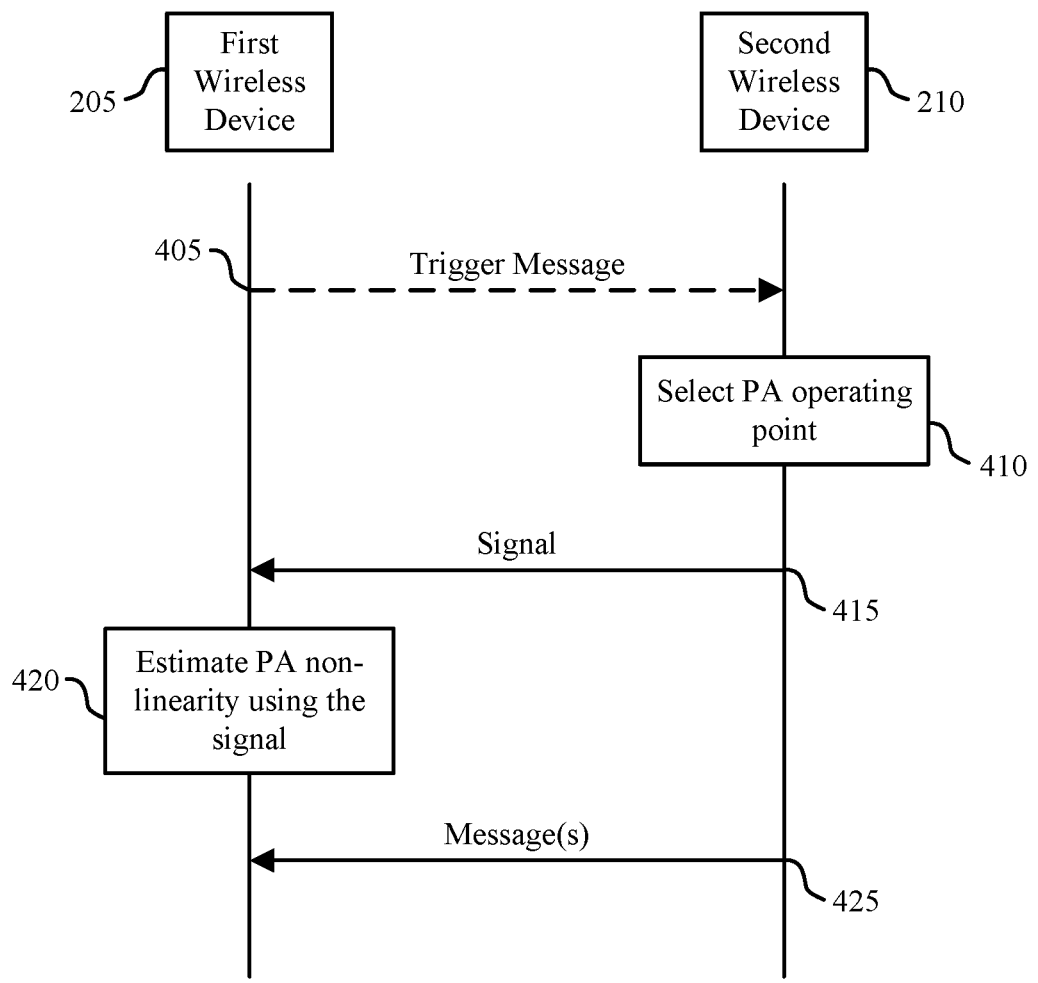
FIG. 4 shows an example process flow that supports non-linearity estimation techniques for DPoD in a wireless system.

FIG. 4 shows an example process flow 400 that supports non-linearity estimation techniques for DPoD in a wireless system. The process flow 400 may implement or be implemented by aspects of the wireless communications system 100, the signaling diagram 200, or any one or more of the PA non-linear estimations 300, 301, or 302. For example, the process flow 400 illustrates communication between a first wireless device 205 and a second wireless device 210. The first wireless device 205 may be an example of the first wireless device 205 as illustrated by or described with reference to FIGS. 2 and 3. The second wireless device 210 may be an example of the second wireless device 210 as illustrated by or described with reference to FIG. 2 or 3. In some implementations, the first wireless device 205 may support a selection criterion associated with what signaling the first wireless device 205 may use to estimate a PA non-linearity of the second wireless device 210.

In the following description of the process flow 400, the operations may be performed (such as reported or provided) in a different order than the order shown, or the operations performed by the example devices may be performed in different orders or at different times. Some operations also may be left out of the process flow 400, or other operations may be added to the process flow 400. Further, although some operations or signaling may be shown to occur at different times for discussion purposes, these operations may actually occur at the same time.

At 405, the first wireless device 205 may, in some implementations, transmit a trigger message (such as a request) for a dedicated pilot signal. The first wireless device 205 may transmit such a request for a dedicated pilot signal in accordance with the first wireless device 205 and the second wireless device 210 supporting dedicated signaling associated with PA model estimation at the first wireless device 205.

At 410, the second wireless device 210 may select a PA operating point. In some implementations, the second wireless device 210 may select the PA operating point in accordance with system or specification guidelines or constraints and one or more channel conditions or metrics. In some other implementations, the second wireless device 210 may select the PA operating point in accordance with transmitting a signal that triggers PA model estimation at the first wireless device 205, such as a pilot signal that is dedicated for PA model estimation. In such implementations, the PA operating point may be associated with the dedicated pilot signal indicating a trigger for the estimation of the PA non-linearity. For example, the second wireless device 210 may use, consider, or expect a PA non-linearity estimation at the first wireless device 205 in addition to, or as an alternative to, using or considering system or specification guidelines or constraints and one or more channel conditions or metrics when selecting a PA operating point. As such, the second wireless device 210 may select a PA operating point that is relatively more or less compressed than what might otherwise be selected if the first wireless device 205 is not expected to perform PA non-linearity estimation.

In some implementations, the second wireless device 210 may select a PA operating point in accordance with a PA compression scheme that is enabled in accordance with transmitting a signal that triggers PA model estimation at the first wireless device 205. Gain compression may occur when an input power of a PA is increased to a level that reduces a gain of the PA and causes a non-linear increase in output power. Accordingly, in implementations in which the PA operating point is associated with the PA compression scheme, the second wireless device 210 may operate using a transmit power in a non-linear region of the PA 220 in accordance with the PA compression scheme.

At 415, the first wireless device 205 may receive, during a first slot, a signal associated with a dynamic power range. In some implementations, the first wireless device 205 may measure, calculate, identify, or otherwise determine that the dynamic power range of the signal triggers an estimation of a PA non-linearity (of the PA 220 of the second wireless device 210) using the signal. The signal may be a DMRS, a data message, or a dedicated pilot signal and the first wireless device 205 may measure, calculate, identify, or otherwise determine whether the dynamic power range of the signal triggers the PA non-linearity estimation using techniques that may vary in accordance with a type of the signal (such as whether the signal is a DMRS, a data message, or a dedicated pilot signal). Additional details relating to a selection criterion or metric the first wireless device 205 may use to determine whether to use the signal for PA model estimation are illustrated by and described in more detail with reference to FIGS. 2 and 3.

In some aspects, DPoD may work improperly if the second wireless device 210 uses a different PA operating point than the one from which the first wireless device 205 estimates a PA non-linearity. As such, any change in PA operating point at the second wireless device 210 may be followed by PA non-linearity estimation at the first wireless device 205. For example, the second wireless device 210 may trigger PA model estimation at the first wireless device 205 (such as via a signal transmission associated with a dynamic power range that triggers PA non-linearity estimation) whenever the second wireless device 210 adjusts or modifies a PA operating point. Accordingly, the first wireless device 205 and the second wireless device 210 may maintain synchronization between an estimated PA model 220 at the first wireless device 205 and an actually used PA operating point at the second wireless device 210.

At 420, the first wireless device 205 may estimate a PA non-linearity using the signal in accordance with the dynamic power range of the signal triggering PA non-linearity estimation. As such, the first wireless device 205 may calculate, estimate, or otherwise obtain a PA model 225 in accordance with estimating the PA non-linearity and may use the PA model to apply or introduce DPoD to other signaling or messaging received from the second wireless device 210. Additionally, or alternatively, the second wireless device 210 may transmit, to the first wireless device 205, an indication of the PA model 225 associated with the PA 220 of the second wireless device 210.

At 425, the first wireless device 205 may receive, during a second slot, signaling associated with one or more messages. In some implementations, the first wireless device 205 may apply or introduce DPoD to the signaling associated with the one or more messages to obtain information conveyed via the one or more messages and the estimation of the PA non-linearity may be associated with introducing the DPoD. In other words, the first wireless device 205 may introduce DPoD to the signaling associated with the one or more data messages in accordance with applying an inverse of a PA model 225 that the first wireless device 205 generates using the estimated PA non-linearity. The second wireless device 210 may transmit the signaling associated with the one or more messages using a same PA operating point as used for the transmission of the signal at 415. In some implementations, the second wireless device 210 may transmit the signaling associated with the one or more messages using a PA compression scheme in accordance with transmitting the signal that triggers the PA model estimation at the first wireless device 205.

Figure 5:
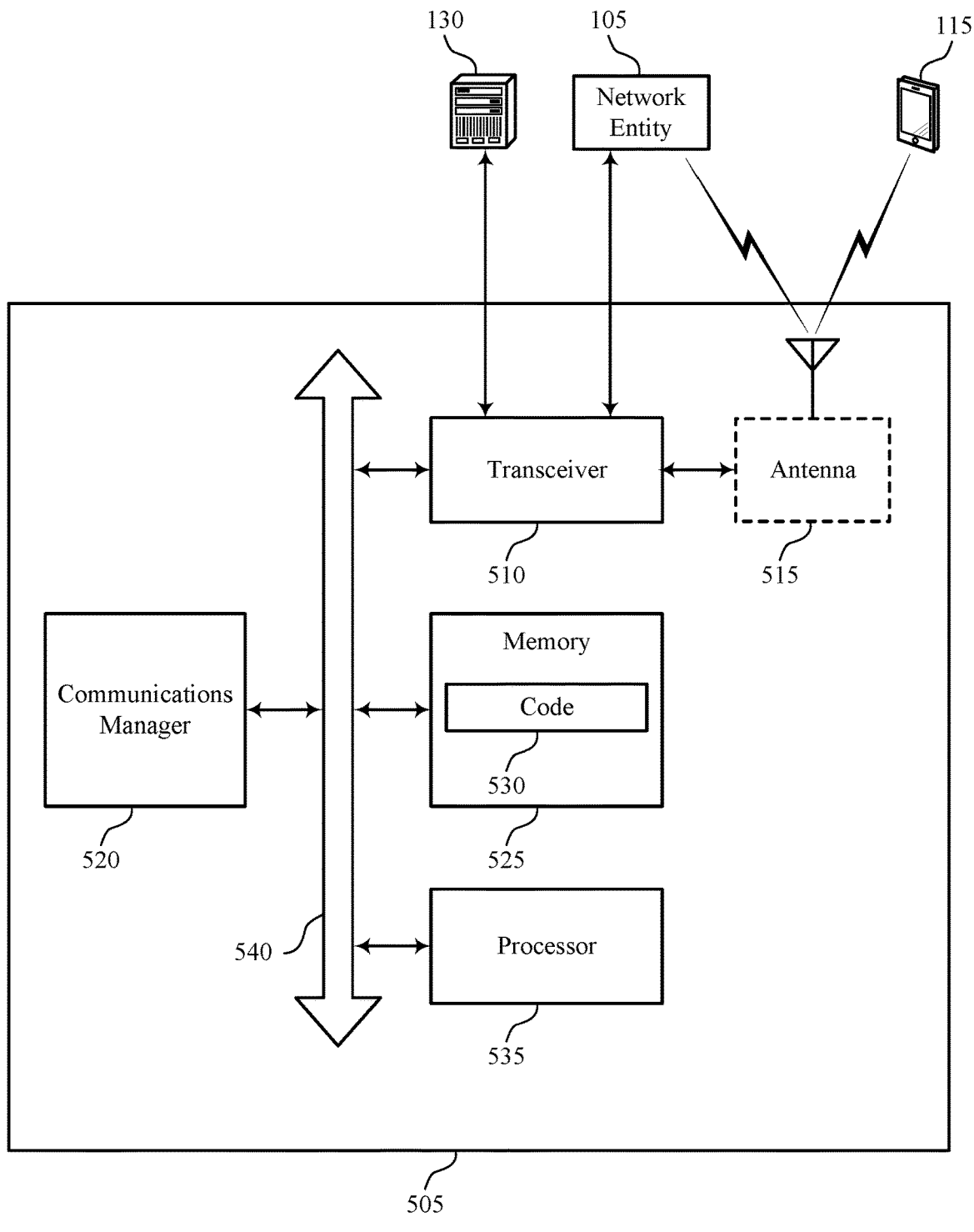
FIGS. 5 and 6 show block diagrams of example devices that support non-linearity estimation techniques for DPoD in a wireless system.

FIG. 5 shows a block diagram 500 of an example device 505 that supports non-linearity estimation techniques for DPoD in a wireless system. The device 505 may communicate with one or more network entities (such as one or more components of one or more network entities 105), one or more UEs 115, or any combination thereof, which may include communications over one or more wired interfaces, over one or more wireless interfaces, or any combination thereof. The device 505 may include components that support outputting and obtaining communications, such as a communications manager 520, a transceiver 510, an antenna 515, a memory 525, code 530, and a processor 535. These components may be in electronic communication or otherwise coupled (such as operatively, communicatively, functionally, electronically, electrically) via one or more buses (such as a bus 540).

The transceiver 510 may support bi-directional communications via wired links, wireless links, or both as described herein. In some implementations, the transceiver 510 may include a wired transceiver and may communicate bi-directionally with another wired transceiver. Additionally, or alternatively, in some examples, the transceiver 510 may include a wireless transceiver and may communicate bi-directionally with another wireless transceiver. In some implementations, the device 505 may include one or more antennas 515, which may be capable of transmitting or receiving wireless transmissions (such as concurrently). The transceiver 510 also may include a modem to modulate signals, to provide the modulated signals for transmission (such as by one or more antennas 515, by a wired transmitter), to receive modulated signals (such as from one or more antennas 515, from a wired receiver), and to demodulate signals.

In some implementations, the transceiver 510 may include one or more interfaces, such as one or more interfaces coupled with the one or more antennas 515 that are configured to support various receiving or obtaining operations, or one or more interfaces coupled with the one or more antennas 515 that are configured to support various transmitting or outputting operations, or a combination thereof. In some implementations, the transceiver 510 may include or be configured for coupling with one or more processors or memory components that are operable to perform or support operations based on received or obtained information or signals, or to generate information or other signals for transmission or other outputting, or any combination thereof. In some implementations, the transceiver 510, or the transceiver 510 and the one or more antennas 515, or the transceiver 510 and the one or more antennas 515 and one or more processors or memory components (such as the processor 535, or the memory 525, or both), may be included in a chip or chip assembly that is installed in the device 505. In some implementations, the transceiver may be operable to support communications via one or more communications links (such as a communication link 125, a backhaul communication link 120, a midhaul communication link 162, a fronthaul communication link 168).

The memory 525 may include random access memory (RAM) and read-only memory (ROM). The memory 525 may store computer-readable, computer-executable code 530 including instructions that, when executed by the processor 535, cause the device 505 to perform various functions described herein. The code 530 may be stored in a non-transitory computer-readable medium such as system memory or another type of memory. In some implementations, the code 530 may not be directly executable by the processor 535 but may cause a computer (such as when compiled and executed) to perform functions described herein. In some implementations, the memory 525 may contain, among other things, a basic input/output (I/O) system (BIOS) which may control basic hardware or software operation such as the interaction with peripheral components or devices.

The processor 535 may include an intelligent hardware device (such as a general-purpose processor, a digital signal processor (DSP), an application-specific integrated circuit (ASIC), a central processing unit (CPU), a field-programmable gate array (FPGA), a microcontroller, a programmable logic device, discrete gate or transistor logic, a discrete hardware component, or any combination thereof). In some implementations, the processor 535 may be configured to operate a memory array using a memory controller. In some other implementations, a memory controller may be integrated into the processor 535. The processor 535 may be configured to execute computer-readable instructions stored in a memory (such as the memory 525) to cause the device 505 to perform various functions (such as functions or tasks supporting non-linearity estimation techniques for DPoD in a wireless system). For example, the device 505 or a component of the device 505 may include a processor 535 and memory 525 coupled with the processor 535, the processor 535 and memory 525 configured to perform various functions described herein. The processor 535 may be an example of a cloud-computing platform (such as one or more physical nodes and supporting software such as operating systems, virtual machines, or container instances) that may host the functions (such as by executing code 530) to perform the functions of the device 505. The processor 535 may be any one or more suitable processors capable of executing scripts or instructions of one or more software programs stored in the device 505 (such as within the memory 525).

In some implementations, the processor 535 may be a component of a processing system. A processing system may generally refer to a system or series of machines or components that receives inputs and processes the inputs to produce a set of outputs (which may be passed to other systems or components of, for example, the device 505). For example, a processing system of the device 505 may refer to a system including the various other components or subcomponents of the device 505, such as the processor 535, or the transceiver 510, or the communications manager 520, or other components or combinations of components of the device 505. The processing system of the device 505 may interface with other components of the device 505, and may process information received from other components (such as inputs or signals) or output information to other components. For example, a chip or modem of the device 505 may include a processing system and an interface to output information, or to obtain information, or both. The interface may be implemented as or otherwise include one or more interfaces, such as a first interface configured to output information and a second interface configured to obtain information. In some implementations, the first interface may refer to an interface between the processing system of the chip or modem and a transmitter, such that the device 505 may transmit information output from the chip or modem. In some implementations, the second interface may refer to an interface between the processing system of the chip or modem and a receiver, such that the device 505 may obtain information or signal inputs, and the information may be passed to the processing system. A person having ordinary skill in the art will readily recognize that the first interface also may obtain information or signal inputs, and the second interface also may output information or signal outputs. As such, one or more interfaces may refer to a single interface configured to output information and obtain information or may refer to multiple interfaces including one interface configured to at least output information and another interface configured to at least obtain information.

In some implementations, a bus 540 may support communications of (such as within) a protocol layer of a protocol stack. In some implementations, a bus 540 may support communications associated with a logical channel of a protocol stack (such as between protocol layers of a protocol stack), which may include communications performed within a component of the device 505, or between different components of the device 505 that may be co-located or located in different locations (such as where the device 505 may refer to a system in which one or more of the communications manager 520, the transceiver 510, the memory 525, the code 530, and the processor 535 may be located in one of the different components or divided between different components).

In some implementations, the communications manager 520 may manage aspects of communications with a core network 130 (such as via one or more wired or wireless backhaul links). For example, the communications manager 520 may manage the transfer of data communications for client devices, such as one or more UEs 115. In some implementations, the communications manager 520 may manage communications with other network entities 105, and may include a controller or scheduler for controlling communications with UEs 115 in cooperation with other network entities 105. In some implementations, the communications manager 520 may support an X2 interface within an LTE/LTE-A wireless communications network technology to provide communication between network entities 105.

The communications manager 520 may support wireless communication at a wireless device in accordance with examples as disclosed herein. For example, the communications manager 520 may be configured as or otherwise support a means for receiving, during a first slot, a signal associated with a dynamic power range, where the dynamic power range triggers an estimation of a PA non-linearity using the signal. The communications manager 520 may be configured as or otherwise support a means for receiving, during a second slot, signaling associated with one or more messages, where the estimation of the PA non-linearity is associated with applying DPoD to the signaling.

In some implementations, to support receiving the signal, the communications manager 520 may be configured as or otherwise support a means for receiving a DMRS associated with the dynamic power range, where the dynamic power range is associated with a PAPR of the DMRS, and where the PAPR of the DMRS triggers the estimation of the PA non-linearity.

In some implementations, the communications manager 520 may be configured as or otherwise support a means for receiving a set of multiple DMRSs across a set of multiple slots, each DMRS of the set of multiple DMRSs being received during a different slot, where the set of multiple DMRSs include the DMRS and a second DMRS. In some implementations, the communications manager 520 may be configured as or otherwise support a means for estimating the PA non-linearity associated with the DMRS in accordance with the PAPR of the DMRS triggering the estimation of the PA non-linearity.

In some implementations, the communications manager 520 may be configured as or otherwise support a means for refraining from estimating a second PA non-linearity using the second DMRS in accordance with the second DMRS being associated with a second PAPR that fails to trigger an estimation of the second PA non-linearity.

In some implementations, the PAPR of the DMRS is associated with a detected sequence of the DMRS.

In some implementations, the communications manager 520 may be configured as or otherwise support a means for transmitting a request to increase to an MCS associated with the one or more messages in accordance with the estimation of the PA non-linearity, where receiving the signaling associated with the one or more messages is in accordance with the request to increase the MCS.

In some implementations, to support receiving the signal, the communications manager 520 may be configured as or otherwise support a means for receiving a data message associated with the dynamic power range, where the dynamic power range of the data message triggers the estimation of the PA non-linearity in accordance with the data message spanning an entirety of the first slot.

In some implementations, the communications manager 520 may be configured as or otherwise support a means for decoding the data message to obtain information conveyed via the data message. In some implementations, the communications manager 520 may be configured as or otherwise support a means for encoding the data message as a pilot signal. In some implementations, the communications manager 520 may be configured as or otherwise support a means for estimating the PA non-linearity using the pilot signal in accordance with the dynamic power range, where the estimation of the PA non-linearity is associated with estimating the PA non-linearity using the pilot signal.

In some implementations, to support receiving the signal, the communications manager 520 may be configured as or otherwise support a means for receiving a dedicated pilot signal associated with the estimation of the PA non-linearity, where the dynamic power range is associated with a PAPR of the dedicated pilot signal, and where the PAPR of the dedicated pilot signal triggers the estimation of the PA non-linearity.

In some implementations, the communications manager 520 may be configured as or otherwise support a means for transmitting a request for the dedicated pilot signal, where receiving the dedicated pilot signal is associated with transmitting the request.

In some implementations, the communications manager 520 may be configured as or otherwise support a means for transmitting an indication of a PA model change at the wireless device, where receiving the dedicated pilot signal is associated with transmitting the indication.

In some implementations, to support receiving the signaling associated with the one or more messages, the communications manager 520 may be configured as or otherwise support a means for receiving information from the one or more messages in accordance with the application of the DPoD associated with the estimation of the PA non-linearity to the signaling, where the DPoD is enabled in accordance with the estimation of the PA non-linearity, and where the second slot is subsequent to the first slot.

Additionally, or alternatively, the communications manager 520 may support wireless communication at a wireless device in accordance with examples as disclosed herein. For example, the communications manager 520 may be configured as or otherwise support a means for transmitting, during a first slot, a dedicated pilot signal associated with a dynamic power range, where the dynamic power range indicates a trigger for an estimation of a PA non-linearity. The communications manager 520 may be configured as or otherwise support a means for transmitting, during a second slot, signaling associated with one or more messages using a PA operating point, where the PA operating point is associated with the dedicated pilot signal indicating the trigger for the estimation of the PA non-linearity.

In some implementations, the communications manager 520 may be configured as or otherwise support a means for receiving a request for the dedicated pilot signal, where transmitting the dedicated pilot signal is associated with receiving the request.

In some implementations, the communications manager 520 may be configured as or otherwise support a means for receiving an indication of a PA model change at a second wireless device, where transmitting the dedicated pilot signal is associated with receiving the indication.

In some implementations, to support transmitting the signaling associated with the one or more messages, the communications manager 520 may be configured as or otherwise support a means for transmitting the one or more messages in accordance with a PA compression scheme, where the PA compression scheme is enabled in accordance with transmitting the dedicated pilot signal that indicates the trigger for the estimation of the PA non-linearity, where the PA operating point is associated with the PA compression scheme, and where the second slot is subsequent to the first slot.

In some implementations, the communications manager 520 may be configured to perform various operations (such as receiving, obtaining, monitoring, outputting, transmitting) using or otherwise in cooperation with the transceiver 510, the one or more antennas 515 (such as where applicable), or any combination thereof. Although the communications manager 520 is illustrated as a separate component, in some examples, one or more functions described with reference to the communications manager 520 may be supported by or performed by the processor 535, the memory 525, the code 530, the transceiver 510, or any combination thereof. For example, the code 530 may include instructions executable by the processor 535 to cause the device 505 to perform various aspects of non-linearity estimation techniques for DPoD in a wireless system as described herein, or the processor 535 and the memory 525 may be otherwise configured to perform or support such operations.

Figure 6:
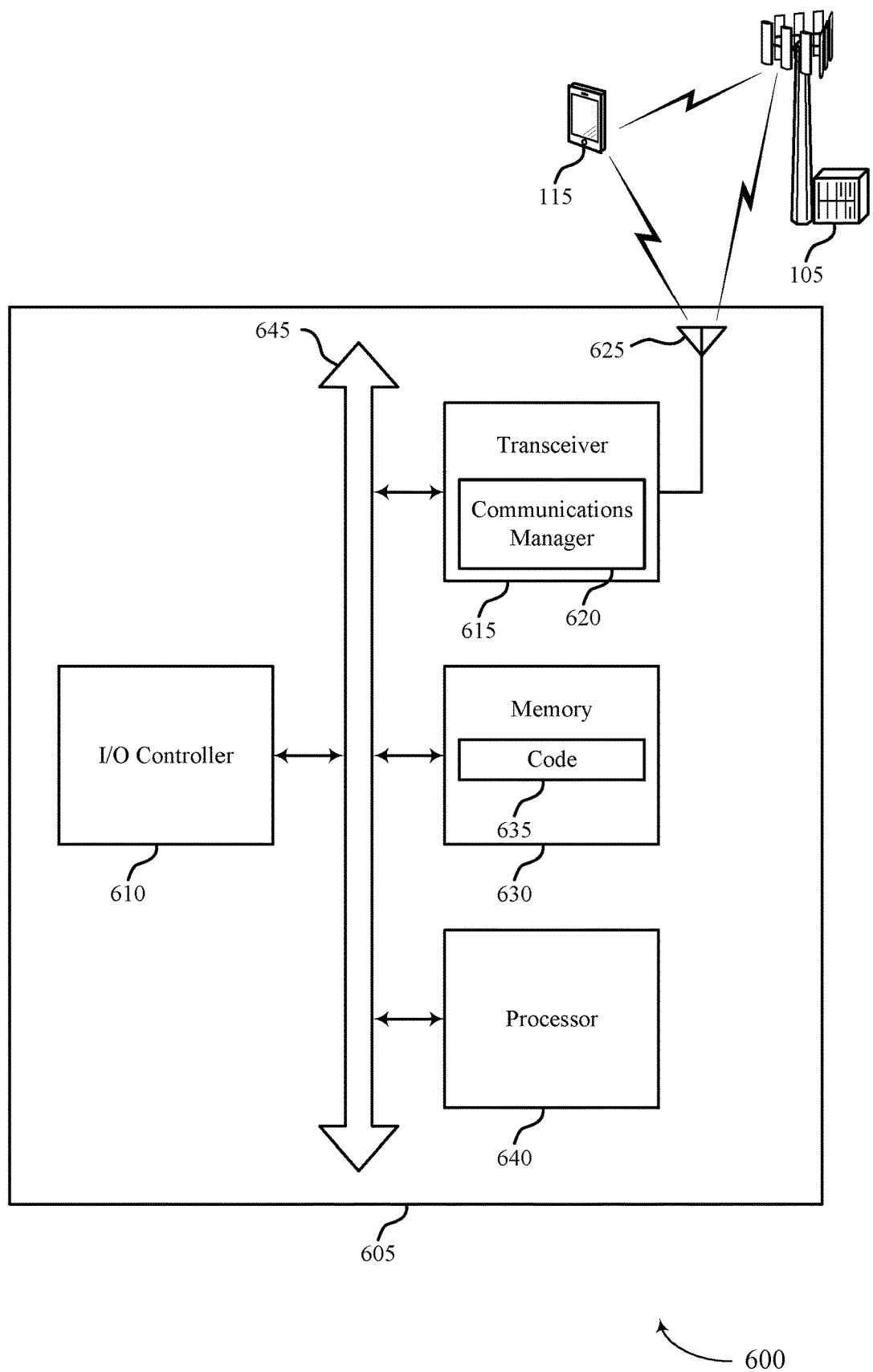

FIG. 6 shows a block diagram 600 of an example device 605 that supports non-linearity estimation techniques for DPoD in a wireless system. The device 605 may communicate (such as wirelessly) with one or more network entities (such as one or more components of one or more network entities 105), one or more UEs 115, or any combination thereof. The device 605 may include components for bi-directional voice and data communications including components for transmitting and receiving communications, such as a communications manager 620, an I/O controller 610, a transceiver 615, an antenna 625, a memory 630, code 635, and a processor 640. These components may be in electronic communication or otherwise coupled (such as operatively, communicatively, functionally, electronically, electrically) via one or more buses (such as a bus 645).

The I/O controller 610 may manage input and output signals for the device 605. The I/O controller 610 also may manage peripherals not integrated into the device 605. In some implementations, the I/O controller 610 may represent a physical connection or port to an external peripheral. In some implementations, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some implementations, the I/O controller 610 may be implemented as part of a processor or processing system, such as the processor 640. In some implementations, a user may interact with the device 605 via the I/O controller 610 or via hardware components controlled by the I/O controller 610.

In some implementations, the device 605 may include a single antenna 625. However, in some other implementations, the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625. In some implementations, the transceiver 615 may include one or more interfaces, such as one or more interfaces coupled with the one or more antennas 625 that are configured to support various receiving or obtaining operations, or one or more interfaces coupled with the one or more antennas 625 that are configured to support various transmitting or outputting operations, or a combination thereof. In some implementations, the transceiver 615 may include or be configured for coupling with one or more processors or memory components that are operable to perform or support operations based on received or obtained information or signals, or to generate information or other signals for transmission or other outputting, or any combination thereof. In some implementations, the transceiver 615, or the transceiver 615 and the one or more antennas 625, or the transceiver 615 and the one or more antennas 625 and one or more processors or memory components (such as the processor 640, or the memory 630, or both), may be included in a chip or chip assembly that is installed in the device 605.

The memory 630 may include RAM and ROM. The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some implementations, the code 635 may not be directly executable by the processor 640 but may cause a computer (such as when compiled and executed) to perform functions described herein. In some implementations, the memory 630 may contain, among other things, a BIOS which may control basic hardware or software operation such as the interaction with peripheral components or devices.

The processor 640 may be any one or more suitable processors capable of executing scripts or instructions of one or more software programs stored in the device 605 (such as within the memory 630). In some implementations, the processor 640 may be a component of a processing system. A processing system may generally refer to a system or series of machines or components that receives inputs and processes the inputs to produce a set of outputs (which may be passed to other systems or components of, for example, the device 605). For example, a processing system of the device 605 may refer to a system including the various other components or subcomponents of the device 605, such as the processor 640, or the transceiver 615, or the communications manager 620, or other components or combinations of components of the device 605.

The processing system of the device 605 may interface with other components of the device 605, and may process information received from other components (such as inputs or signals) or output information to other components. For example, a chip or modem of the device 605 may include a processing system and an interface to output information, or to obtain information, or both. The interface may be implemented as or otherwise include one or more interfaces, such as a first interface configured to output information and a second interface configured to obtain information. In some implementations, the first interface may refer to an interface between the processing system of the chip or modem and a transmitter, such that the device 605 may transmit information output from the chip or modem. In some implementations, the second interface may refer to an interface between the processing system of the chip or modem and a receiver, such that the device 605 may obtain information or signal inputs, and the information may be passed to the processing system. A person having ordinary skill in the art will readily recognize that the first interface also may obtain information or signal inputs, and the second interface also may output information or signal outputs. As such, one or more interfaces may refer to a single interface configured to output information and obtain information or may refer to multiple interfaces including one interface configured to at least output information and another interface configured to at least obtain information.

The communications manager 620 may support wireless communication at a wireless device in accordance with examples as disclosed herein. For example, the communications manager 620 may be configured as or otherwise support a means for receiving, during a first slot, a signal associated with a dynamic power range, where the dynamic power range triggers an estimation of a PA non-linearity using the signal. The communications manager 620 may be configured as or otherwise support a means for receiving, during a second slot, signaling associated with one or more messages, where the estimation of the PA non-linearity is associated with an application of DPoD to the signaling.

In some implementations, to support receiving the signal, the communications manager 620 may be configured as or otherwise support a means for receiving a DMRS associated with the dynamic power range, where the dynamic power range is associated with a PAPR of the DMRS, and where the PAPR of the DMRS triggers the estimation of the PA non-linearity.

In some implementations, the communications manager 620 may be configured as or otherwise support a means for receiving a set of multiple DMRSs across a set of multiple slots, each DMRS of the set of multiple DMRSs being received during a different slot, where the set of multiple DMRSs include the DMRS and a second DMRS. In some implementations, the communications manager 620 may be configured as or otherwise support a means for estimating the PA non-linearity associated with the DMRS in accordance with the PAPR of the DMRS triggering the estimation of the PA non-linearity.

In some implementations, the communications manager 620 may be configured as or otherwise support a means for refraining from estimating a second PA non-linearity using the second DMRS in accordance with the second DMRS being associated with a second PAPR that fails to trigger an estimation of the second PA non-linearity.

In some implementations, the PAPR of the DMRS is associated with a detected sequence of the DMRS.

In some implementations, the communications manager 620 may be configured as or otherwise support a means for transmitting a request to increase to an MCS associated with the one or more messages in accordance with the estimation of the PA non-linearity, where receiving the signaling associated with the one or more messages is in accordance with the request to increase the MCS.

In some implementations, to support receiving the signal, the communications manager 620 may be configured as or otherwise support a means for receiving a data message associated with the dynamic power range, where the dynamic power range of the data message triggers the estimation of the PA non-linearity in accordance with the data message spanning an entirety of the first slot.

In some implementations, the communications manager 620 may be configured as or otherwise support a means for decoding the data message to obtain information conveyed via the data message. In some implementations, the communications manager 620 may be configured as or otherwise support a means for encoding the data message as a pilot signal. In some implementations, the communications manager 620 may be configured as or otherwise support a means for estimating the PA non-linearity using the pilot signal in accordance with the dynamic power range, where the estimation of the PA non-linearity is associated with estimating the PA non-linearity using the pilot signal.

In some implementations, to support receiving the signal, the communications manager 620 may be configured as or otherwise support a means for receiving a dedicated pilot signal associated with the estimation of the PA non-linearity, where the dynamic power range is associated with a PAPR of the dedicated pilot signal, and where the PAPR of the dedicated pilot signal triggers the estimation of the PA non-linearity.

In some implementations, the communications manager 620 may be configured as or otherwise support a means for transmitting a request for the dedicated pilot signal, where receiving the dedicated pilot signal is associated with transmitting the request.

In some implementations, the communications manager 620 may be configured as or otherwise support a means for transmitting an indication of a PA model change at the wireless device, where receiving the dedicated pilot signal is associated with transmitting the indication.

In some implementations, to support receiving the signaling associated with the one or more messages, the communications manager 620 may be configured as or otherwise support a means for receiving information from the one or more messages in accordance with the application of the DPoD associated with the estimation of the PA non-linearity to the signaling, where the DPoD is enabled in accordance with the estimation of the PA non-linearity, and where the second slot is subsequent to the first slot.

Additionally, or alternatively, the communications manager 620 may support wireless communication at a wireless device in accordance with examples as disclosed herein. For example, the communications manager 620 may be configured as or otherwise support a means for transmitting, during a first slot, a dedicated pilot signal associated with a dynamic power range, where the dynamic power range indicates a trigger for an estimation of a PA non-linearity. The communications manager 620 may be configured as or otherwise support a means for transmitting, during a second slot, signaling associated with one or more messages using a PA operating point, where the PA operating point is associated with the dedicated pilot signal indicating the trigger for the estimation of the PA non-linearity.

In some implementations, the communications manager 620 may be configured as or otherwise support a means for receiving a request for the dedicated pilot signal, where transmitting the dedicated pilot signal is associated with receiving the request.

In some implementations, the communications manager 620 may be configured as or otherwise support a means for receiving an indication of a PA model change at a second wireless device, where transmitting the dedicated pilot signal is associated with receiving the indication.

In some implementations, to support transmitting the signaling associated with the one or more messages, the communications manager 620 may be configured as or otherwise support a means for transmitting the one or more messages in accordance with a PA compression scheme, where the PA compression scheme is enabled in accordance with transmitting the dedicated pilot signal that indicates the trigger for the estimation of the PA non-linearity, where the PA operating point is associated with the PA compression scheme, and where the second slot is subsequent to the first slot.

In some implementations, the communications manager 620 may be configured to perform various operations (such as receiving, monitoring, transmitting) using or otherwise in cooperation with the transceiver 615, the one or more antennas 625, or any combination thereof. Although the communications manager 620 is illustrated as a separate component, in some implementations, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of non-linearity estimation techniques for DPoD in a wireless system as described herein, or the processor 640 and the memory 630 may be otherwise configured to perform or support such operations.

Figure 7:
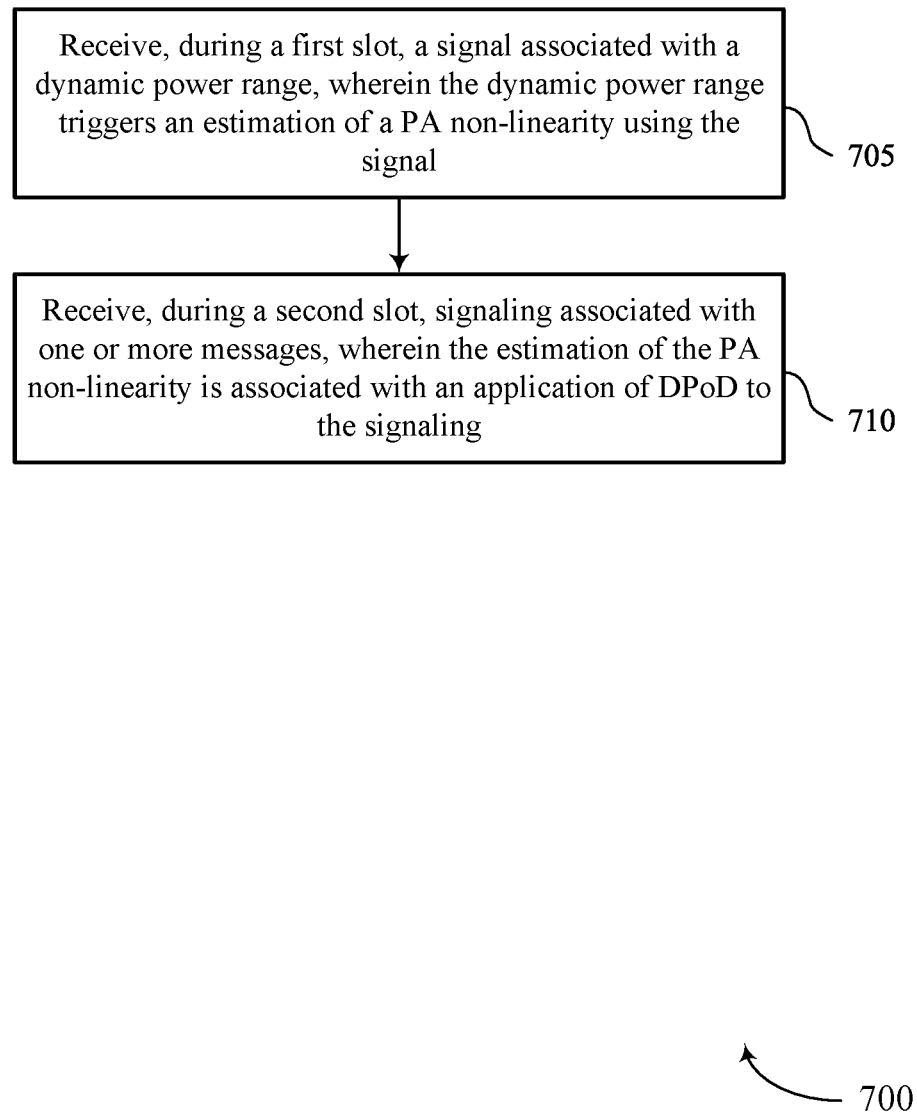
FIGS. 7 and 8 show flowcharts illustrating example methods that support non-linearity estimation techniques for DPoD in a wireless system.

FIG. 7 shows a flowchart illustrating an example method 700 that supports non-linearity estimation techniques for DPoD in a wireless system. The operations of the method 700 may be implemented by a UE or a network entity or its components as described herein. For example, the operations of the method 700 may be performed by a UE 115 or a network entity as described with reference to FIGS. 1-6. In some implementations, a UE or a network entity may execute a set of instructions to control the functional elements of the UE or the network entity to perform the described functions. Additionally, or alternatively, the UE or the network entity may perform aspects of the described functions using special-purpose hardware.

At 705, the method may include receiving, during a first slot, a signal associated with a dynamic power range, where the dynamic power range triggers an estimation of a PA non-linearity using the signal. The operations of 705 may be performed in accordance with examples as disclosed herein.

At 710, the method may include receiving, during a second slot, signaling associated with one or more messages, where the estimation of the PA non-linearity is associated with an application of DPoD to the signaling. The operations of 710 may be performed in accordance with examples as disclosed herein.

Figure 8:
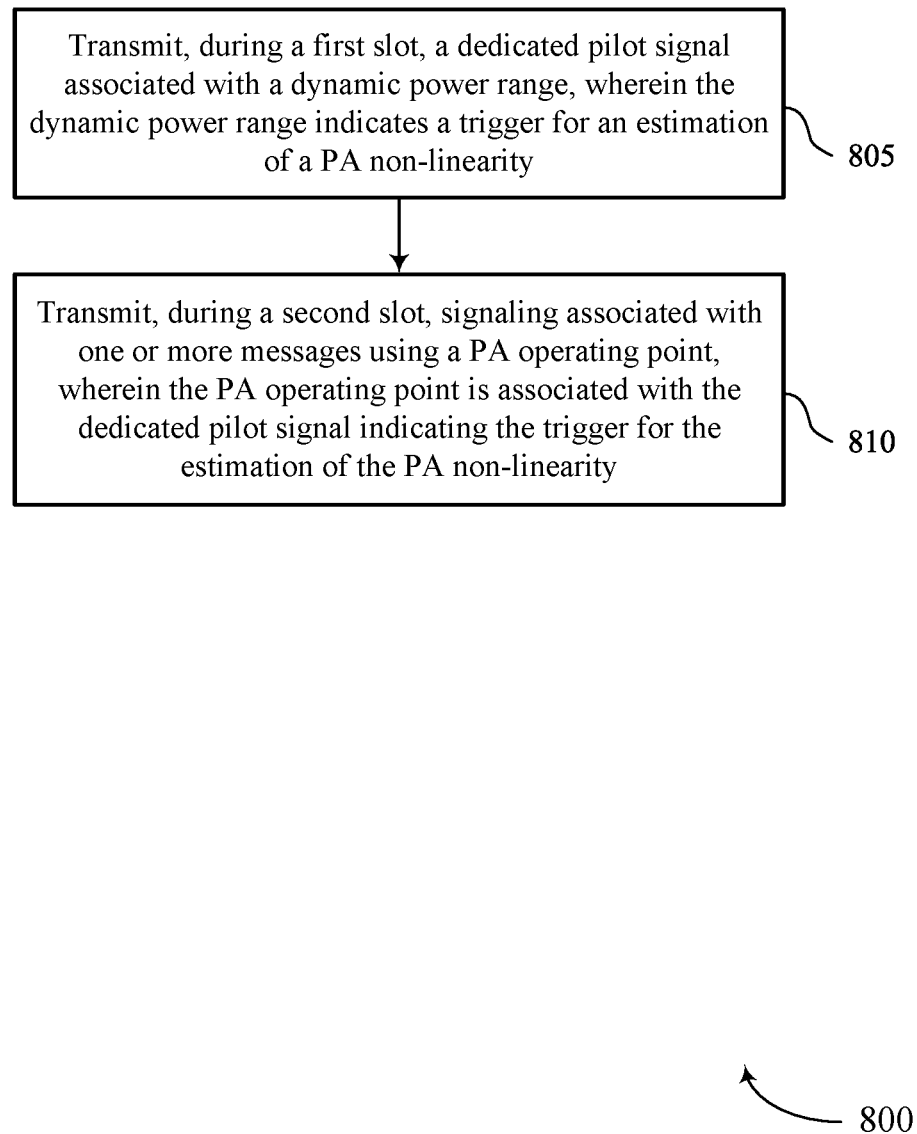

FIG. 8 shows a flowchart illustrating an example method 800 that supports non-linearity estimation techniques for DPoD in a wireless system. The operations of the method 800 may be implemented by a UE or a network entity or its components as described herein. For example, the operations of the method 800 may be performed by a UE 115 or a network entity as described with reference to FIGS. 1-6. In some implementations, a UE or a network entity may execute a set of instructions to control the functional elements of the UE or the network entity to perform the described functions. Additionally, or alternatively, the UE or the network entity may perform aspects of the described functions using special-purpose hardware.

At 805, the method may include transmitting, during a first slot, a dedicated pilot signal associated with a dynamic power range, where the dynamic power range indicates a trigger for an estimation of a PA non-linearity. The operations of 805 may be performed in accordance with examples as disclosed herein.

At 810, the method may include transmitting, during a second slot, signaling associated with one or more messages using a PA operating point, where the PA operating point is associated with the dedicated pilot signal indicating the trigger for the estimation of the PA non-linearity. The operations of 810 may be performed in accordance with examples as disclosed herein.

The following provides an overview of some aspects of the present disclosure:

Aspect 1: A method for wireless communication at a wireless device, including: receiving, during a first slot, a signal associated with a dynamic power range, where the dynamic power range triggers an estimation of a PA non-linearity using the signal; and receiving, during a second slot, signaling associated with one or more messages, where the estimation of the PA non-linearity is associated with an application of DPoD to the signaling.

Aspect 2: The method of aspect 1, where receiving the signal includes: receiving a DMRS associated with the dynamic power range, where the dynamic power range is associated with a PAPR of the DMRS, and where the PAPR of the DMRS triggers the estimation of the PA non-linearity.

Aspect 3: The method of aspect 2, further including: receiving a set of multiple DMRSs across a set of multiple slots, each DMRS of the set of multiple DMRSs being received during a different slot, where the set of multiple DMRSs include the DMRS and a second DMRS; and estimating the PA non-linearity associated with the DMRS in accordance with the PAPR of the DMRS triggering the estimation of the PA non-linearity.

Aspect 4: The method of aspect 3, further including: refraining from estimating a second PA non-linearity using the second DMRS in accordance with the second DMRS being associated with a second PAPR that fails to trigger an estimation of the second PA non-linearity.

Aspect 5: The method of any of aspects 2-4, where the PAPR of the DMRS is associated with a detected sequence of the DMRS.

Aspect 6: The method of any of aspects 1-5, further including: transmitting a request to increase to an MCS associated with the one or more messages in accordance with the estimation of the PA non-linearity, where receiving the signaling associated with the one or more messages is in accordance with the request to increase the MCS.

Aspect 7: The method of any of aspects 1-6, where receiving the signal includes: receiving a data message associated with the dynamic power range, where the dynamic power range of the data message triggers the estimation of the PA non-linearity in accordance with the data message spanning an entirety of the first slot.

Aspect 8: The method of aspect 7, further including: decoding the data message to obtain information conveyed via the data message; encoding the data message as a pilot signal; and estimating the PA non-linearity using the pilot signal in accordance with the dynamic power range, where the estimation of the PA non-linearity is associated with estimating the PA non-linearity using the pilot signal.

Aspect 9: The method of any of aspects 1-8, where receiving the signal includes: receiving a dedicated pilot signal associated with the estimation of the PA non-linearity, where the dynamic power range is associated with a PAPR of the dedicated pilot signal, and where the PAPR of the dedicated pilot signal triggers the estimation of the PA non-linearity.

Aspect 10: The method of aspect 9, further including: transmitting a request for the dedicated pilot signal, where receiving the dedicated pilot signal is associated with transmitting the request.

Aspect 11: The method of any of aspects 9-10, further including: transmitting an indication of a PA model change at the wireless device, where receiving the dedicated pilot signal is associated with transmitting the indication.

Aspect 12: The method of any of aspects 1-11, where receiving the signaling associated with the one or more messages includes: receiving information from the one or more messages in accordance with the application of the digital post distortion associated with the estimation of the PA non-linearity to the signaling, where the digital post distortion is enabled in accordance with the estimation of the PA non-linearity, and where the second slot is subsequent to the first slot.

Aspect 13: A method for wireless communication at a wireless device, including: transmitting, during a first slot, a dedicated pilot signal associated with a dynamic power range, where the dynamic power range indicates a trigger for an estimation of a PA non-linearity; and transmitting, during a second slot, signaling associated with one or more messages using a PA operating point, where the PA operating point is associated with the dedicated pilot signal indicating the trigger for the estimation of the PA non-linearity.

Aspect 14: The method of aspect 13, further including: receiving a request for the dedicated pilot signal, where transmitting the dedicated pilot signal is associated with receiving the request.

Aspect 15: The method of any of aspects 13-14, further including: receiving an indication of a PA model change at a second wireless device, where transmitting the dedicated pilot signal is associated with receiving the indication.

Aspect 16: The method of any of aspects 13-15, where transmitting the signaling associated with the one or more messages includes: transmitting the one or more messages in accordance with a PA compression scheme, where the PA compression scheme is enabled in accordance with transmitting the dedicated pilot signal that indicates the trigger for the estimation of the PA non-linearity, where the PA operating point is associated with the PA compression scheme, and where the second slot is subsequent to the first slot.

Aspect 17: An apparatus for wireless communication at a wireless device, including: one or more interfaces configured to: obtain, during a first slot, a signal associated with a dynamic power range, where the dynamic power range triggers an estimation of a PA non-linearity using the signal; and obtain, during a second slot, signaling associated with one or more messages, where the estimation of the PA non-linearity is associated with an application of DPoD to the signaling.

Aspect 18: The apparatus of aspect 17, where, to obtain the signal, the one or more interfaces are further configured to: obtain a DMRS associated with the dynamic power range, where the dynamic power range is associated with a PAPR of the DMRS, and where the PAPR of the DMRS triggers the estimation of the PA non-linearity.

Aspect 19: The apparatus of aspect 18, where: the one or more interfaces are further configured to: obtain a set of multiple DMRSs across a set of multiple slots, each DMRS of the set of multiple DMRSs being obtained during a different slot, where the set of multiple DMRSs include the DMRS and a second DMRS; and a processing system is configured to: estimate the PA non-linearity associated with the DMRS in accordance with the PAPR of the DMRS triggering the estimation of the PA non-linearity.

Aspect 20: The apparatus of aspect 19, where the processing system is further configured to: refrain from estimating a second PA non-linearity using the second DMRS in accordance with the second DMRS being associated with a second PAPR that fails to trigger an estimation of the second PA non-linearity.

Aspect 21: The apparatus of any of aspects 18-20, where the PAPR of the DMRS is associated with a detected sequence of the DMRS.

Aspect 22: The apparatus of any of aspects 17-21, where the one or more interfaces are further configured to: output a request to increase to an MCS associated with the one or more messages in accordance with the estimation of the PA non-linearity, where obtaining the signaling associated with the one or more messages is in accordance with the request to increase the MCS.

Aspect 23: The apparatus of any of aspects 17-22, where, to obtain the signal, the one or more interfaces are further configured to: obtain a data message associated with the dynamic power range, where the dynamic power range of the data message triggers the estimation of the PA non-linearity in accordance with the data message spanning an entirety of the first slot.

Aspect 24: The apparatus of aspect 23, where a processing system is configured to: decode the data message to obtain information conveyed via the data message; encode the data message as a pilot signal; and estimate the PA non-linearity using the pilot signal in accordance with the dynamic power range, where the estimation of the PA non-linearity is associated with estimating the PA non-linearity using the pilot signal.

Aspect 25: The apparatus of any of aspects 17-24, where, to obtain the signal, the one or more interfaces are further configured to: obtain a dedicated pilot signal associated with the estimation of the PA non-linearity, where the dynamic power range is associated with a PAPR of the dedicated pilot signal, and where the PAPR of the dedicated pilot signal triggers the estimation of the PA non-linearity.

Aspect 26: The apparatus of aspect 25, where the one or more interfaces are further configured to: output a request for the dedicated pilot signal, where obtaining the dedicated pilot signal is associated with outputting the request.

Aspect 27: The apparatus of any of aspects 25-26, where the one or more interfaces are further configured to: output an indication of a PA model change at the wireless device, where obtaining the dedicated pilot signal is associated with outputting the indication.

Aspect 28: The apparatus of any of aspects 17-27, where, to obtain the signaling associated with the one or more messages, the one or more interfaces are further configured to: obtain information from the one or more messages in accordance with the application of the DPoD associated with the estimation of the PA non-linearity to the signaling, where the DPoD is enabled in accordance with the estimation of the PA non-linearity, and where the second slot is subsequent to the first slot.

Aspect 29: An apparatus for wireless communication at a wireless device, including: one or more interfaces configured to: output, during a first slot, a dedicated pilot signal associated with a dynamic power range, where the dynamic power range indicates a trigger for an estimation of a PA non-linearity; and output, during a second slot, signaling associated with one or more messages using a PA operating point, where the PA operating point is associated with the dedicated pilot signal indicating the trigger for the estimation of the PA non-linearity.

Aspect 30: The apparatus of aspect 29, where the one or more interfaces are further configured to: obtain a request for the dedicated pilot signal, where outputting the dedicated pilot signal is associated with obtaining the request.

Aspect 31: The apparatus of any of aspects 29-30, where the one or more interfaces are further configured to: obtain an indication of a PA model change at a second wireless device, where outputting the dedicated pilot signal is associated with obtaining the indication.

Aspect 32: The apparatus of any of aspects 29-31, where, to output the signaling associated with the one or more messages, the one or more interfaces are further configured to: output the one or more messages in accordance with a PA compression scheme, where the PA compression scheme is enabled in accordance with outputting the dedicated pilot signal that indicates the trigger for the estimation of the PA non-linearity, where the PA operating point is associated with the PA compression scheme, and where the second slot is subsequent to the first slot.

Aspect 33: An apparatus for wireless communication at a wireless device, including: means for receiving, during a first slot, a signal associated with a dynamic power range, where the dynamic power range triggers an estimation of a PA non-linearity using the signal; and means for receiving, during a second slot, signaling associated with one or more messages, where the estimation of the PA non-linearity is associated with an application of DPoD to the signaling.

Aspect 34: The apparatus of aspect 33, where the means for receiving the signal include: means for receiving a DMRS associated with the dynamic power range, where the dynamic power range is associated with a PAPR of the DMRS, and where the PAPR of the DMRS triggers the estimation of the PA non-linearity.

Aspect 35: The apparatus of aspect 34, further including: means for receiving a set of multiple DMRSs across a set of multiple slots, each DMRS of the set of multiple DMRSs being received during a different slot, where the set of multiple DMRSs include the DMRS and a second DMRS; and means for estimating the PA non-linearity associated with the DMRS in accordance with the PAPR of the DMRS triggering the estimation of the PA non-linearity.

Aspect 36: The apparatus of aspect 35, further including: means for refraining from estimating a second PA non-linearity using the second DMRS in accordance with the second DMRS being associated with a second PAPR that fails to trigger an estimation of the second PA non-linearity.

Aspect 37: The apparatus of any of aspects 34-36, where the PAPR of the DMRS is associated with a detected sequence of the DMRS.

Aspect 38: The apparatus of any of aspects 33-37, further including: means for transmitting a request to increase to an MCS associated with the one or more messages in accordance with the estimation of the PA non-linearity, where receiving the signaling associated with the one or more messages is in accordance with the request to increase the MCS.

Aspect 39: The apparatus of any of aspects 33-38, where the means for receiving the signal include: means for receiving a data message associated with the dynamic power range, where the dynamic power range of the data message triggers the estimation of the PA non-linearity in accordance with the data message spanning an entirety of the first slot.

Aspect 40: The apparatus of aspect 39, further including: means for decoding the data message to obtain information conveyed via the data message; means for encoding the data message as a pilot signal; and means for estimating the PA non-linearity using the pilot signal in accordance with the dynamic power range, where the estimation of the PA non-linearity is associated with estimating the PA non-linearity using the pilot signal.

Aspect 41: The apparatus of any of aspects 33-40, where the means for receiving the signal include: means for receiving a dedicated pilot signal associated with the estimation of the PA non-linearity, where the dynamic power range is associated with a PAPR of the dedicated pilot signal, and where the PAPR of the dedicated pilot signal triggers the estimation of the PA non-linearity.

Aspect 42: The apparatus of aspect 41, further including: means for transmitting a request for the dedicated pilot signal, where receiving the dedicated pilot signal is associated with transmitting the request.

Aspect 43: The apparatus of any of aspects 41-42, further including: means for transmitting an indication of a PA model change at the wireless device, where receiving the dedicated pilot signal is associated with transmitting the indication.

Aspect 44: The apparatus of any of aspects 33-43, where the means for receiving the signaling associated with the one or more messages include: means for receiving information from the one or more messages in accordance with the application of the digital post distortion associated with the estimation of the PA non-linearity to the signaling, where the digital post distortion is enabled in accordance with the estimation of the PA non-linearity, and where the second slot is subsequent to the first slot.

Aspect 45: An apparatus for wireless communication at a wireless device, including: means for transmitting, during a first slot, a dedicated pilot signal associated with a dynamic power range, where the dynamic power range indicates a trigger for an estimation of a PA non-linearity; and means for transmitting, during a second slot, signaling associated with one or more messages using a PA operating point, where the PA operating point is associated with the dedicated pilot signal indicating the trigger for the estimation of the PA non-linearity.

Aspect 46: The apparatus of aspect 45, further including: means for receiving a request for the dedicated pilot signal, where transmitting the dedicated pilot signal is associated with receiving the request.

Aspect 47: The apparatus of any of aspects 45-46, further including: means for receiving an indication of a PA model change at a second wireless device, where transmitting the dedicated pilot signal is associated with receiving the indication.

Aspect 48: The apparatus of any of aspects 45-47, where the means for transmitting the signaling associated with the one or more messages include: means for transmitting the one or more messages in accordance with a PA compression scheme, where the PA compression scheme is enabled in accordance with transmitting the dedicated pilot signal that indicates the trigger for the estimation of the PA non-linearity, where the PA operating point is associated with the PA compression scheme, and where the second slot is subsequent to the first slot.

Aspect 49: A non-transitory computer-readable medium storing code for wireless communication at a wireless device, the code including instructions executable by a processor to: receive, during a first slot, a signal associated with a dynamic power range, where the dynamic power range triggers an estimation of a PA non-linearity using the signal; and receive, during a second slot, signaling associated with one or more messages, where the estimation of the PA non-linearity is associated with an application of DPoD to the signaling.

Aspect 50: The non-transitory computer-readable medium of aspect 49, where the instructions to receive the signal are executable by the processor to: receive a DMRS associated with the dynamic power range, where the dynamic power range is associated with a PAPR of the DMRS, and where the PAPR of the DMRS triggers the estimation of the PA non-linearity.

Aspect 51: The non-transitory computer-readable medium of aspect 50, where the instructions are further executable by the processor to: receive a set of multiple DMRSs across a set of multiple slots, each DMRS of the set of multiple DMRSs being received during a different slot, where the set of multiple DMRSs include the DMRS and a second DMRS; and estimate the PA non-linearity associated with the DMRS in accordance with the PAPR of the DMRS triggering the estimation of the PA non-linearity.

Aspect 52: The non-transitory computer-readable medium of aspect 51, where the instructions are further executable by the processor to: refrain from estimating a second PA non-linearity using the second DMRS in accordance with the second DMRS being associated with a second PAPR that fails to trigger an estimation of the second PA non-linearity.

Aspect 53: The non-transitory computer-readable medium of any of aspects 50-52, where the PAPR of the DMRS is associated with a detected sequence of the DMRS.

Aspect 54: The non-transitory computer-readable medium of any of aspects 49-53, where the instructions are further executable by the processor to: transmit a request to increase to an MCS associated with the one or more messages in accordance with the estimation of the PA non-linearity, where receiving the signaling associated with the one or more messages is in accordance with the request to increase the MCS.

Aspect 55: The non-transitory computer-readable medium of any of aspects 49-54, where the instructions to receive the signal are executable by the processor to: receive a data message associated with the dynamic power range, where the dynamic power range of the data message triggers the estimation of the PA non-linearity in accordance with the data message spanning an entirety of the first slot.

Aspect 56: The non-transitory computer-readable medium of aspect 55, where the instructions are further executable by the processor to: decode the data message to obtain information conveyed via the data message; encode the data message as a pilot signal; and estimate the PA non-linearity using the pilot signal in accordance with the dynamic power range, where the estimation of the PA non-linearity is associated with estimating the PA non-linearity using the pilot signal.

Aspect 57: The non-transitory computer-readable medium of any of aspects 49-56, where the instructions to receive the signal are executable by the processor to: receive a dedicated pilot signal associated with the estimation of the PA non-linearity, where the dynamic power range is associated with a PAPR of the dedicated pilot signal, and where the PAPR of the dedicated pilot signal triggers the estimation of the PA non-linearity.

Aspect 58: The non-transitory computer-readable medium of aspect 57, where the instructions are further executable by the processor to: transmit a request for the dedicated pilot signal, where receiving the dedicated pilot signal is associated with transmitting the request.

Aspect 59: The non-transitory computer-readable medium of any of aspects 57-58, where the instructions are further executable by the processor to: transmit an indication of a PA model change at the wireless device, where receiving the dedicated pilot signal is associated with transmitting the indication.

Aspect 60: The non-transitory computer-readable medium of any of aspects 49-59, where the instructions to receive the signaling associated with the one or more messages are executable by the processor to: receive information from the one or more messages in accordance with the application of the digital post distortion associated with the estimation of the PA non-linearity to the signaling, where the digital post distortion is enabled in accordance with the estimation of the PA non-linearity, and where the second slot is subsequent to the first slot.

Aspect 61: A non-transitory computer-readable medium storing code for wireless communication at a wireless device, the code including instructions executable by a processor to: transmit, during a first slot, a dedicated pilot signal associated with a dynamic power range, where the dynamic power range indicates a trigger for an estimation of a PA non-linearity; and transmit, during a second slot, signaling associated with one or more messages using a PA operating point, where the PA operating point is associated with the dedicated pilot signal indicating the trigger for the estimation of the PA non-linearity.

Aspect 62: The non-transitory computer-readable medium of aspect 61, where the instructions are further executable by the processor to: receive a request for the dedicated pilot signal, where transmitting the dedicated pilot signal is associated with receiving the request.

Aspect 63: The non-transitory computer-readable medium of any of aspects 61-62, where the instructions are further executable by the processor to: receive an indication of a PA model change at a second wireless device, where transmitting the dedicated pilot signal is associated with receiving the indication.

Aspect 64: The non-transitory computer-readable medium of any of aspects 61-63, where the instructions to transmit the signaling associated with the one or more messages are executable by the processor to: transmit the one or more messages in accordance with a PA compression scheme, where the PA compression scheme is enabled in accordance with transmitting the dedicated pilot signal that indicates the trigger for the estimation of the PA non-linearity, where the PA operating point is associated with the PA compression scheme, and where the second slot is subsequent to the first slot.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A wireless device, comprising:
a processing system that includes one or more processors and one or more memories coupled with the one or more processors, the processing system configured to cause the wireless device to:
obtain, during a first slot, a signal associated with a dynamic power range, wherein the dynamic power range triggers an estimation of a power amplifier (PA) non-linearity using the signal;
output a request to increase to a modulation and coding scheme (MCS) associated with one or more messages in accordance with the estimation of the PA non-linearity; and
obtain, during a second slot, signaling associated with the one or more messages in accordance with the request to increase the MCS, wherein the estimation of the PA non-linearity is associated with an application of digital post distortion (DPoD) to the signaling.

2. The wireless device of claim 1, wherein, to obtain the signal, the processing system is further configured to cause the wireless device to:
obtain a demodulation reference signal (DMRS) associated with the dynamic power range, wherein the dynamic power range is associated with a peak-to-average-power ratio (PAPR) of the DMRS, and wherein the PAPR of the DMRS triggers the estimation of the PA non-linearity.

3. The wireless device of claim 2, wherein the processing system is further configured to cause the wireless device to:
obtain a plurality of DMRSs across a plurality of slots, each DMRS of the plurality of DMRSs being obtained during a different slot, wherein the plurality of DMRSs include the DMRS and a second DMRS, and wherein the DMRS and the second DMRS are different; and
estimate the PA non-linearity associated with the DMRS in accordance with the PAPR of the DMRS triggering the estimation of the PA non-linearity.

4. The wireless device of claim 3, wherein the processing system is further configured to cause the wireless device to:
refrain from estimating a second PA non-linearity using the second DMRS in accordance with the second DMRS being associated with a second PAPR that fails to trigger an estimation of the second PA non-linearity.

5. The wireless device of claim 2, wherein the PAPR of the DMRS is associated with a detected sequence of the DMRS.

6. The wireless device of claim 1, wherein, to obtain the signal, the processing system is further configured to cause the wireless device to:
obtain a data message associated with the dynamic power range, wherein the dynamic power range of the data message triggers the estimation of the PA non-linearity in accordance with the data message spanning an entirety of the first slot.

7. The wireless device of claim 6, wherein the processing system is further configured to cause the wireless device to:
decode the data message to obtain information conveyed via the data message;
encode the data message as a pilot signal; and
estimate the PA non-linearity using the pilot signal in accordance with the dynamic power range, wherein the estimation of the PA non-linearity is associated with estimating the PA non-linearity using the pilot signal.

8. The wireless device of claim 1, wherein, to obtain the signal, the processing system is further configured to cause the wireless device to:
obtain a dedicated pilot signal associated with the estimation of the PA non-linearity, wherein the dynamic power range is associated with a peak-to-average-power ratio (PAPR) of the dedicated pilot signal, and wherein the PAPR of the dedicated pilot signal triggers the estimation of the PA non-linearity.

9. The wireless device of claim 8, wherein the processing system is further configured to cause the wireless device to:
output a request for the dedicated pilot signal, wherein obtaining the dedicated pilot signal is associated with outputting the request.

10. The wireless device of claim 8, wherein the processing system is further configured to cause the wireless device to:
output an indication of a PA model change at the wireless device, wherein obtaining the dedicated pilot signal is associated with outputting the indication.

11. The wireless device of claim 1, wherein, to obtain the signaling associated with the one or more messages, the processing system is further configured to cause the wireless device to:
obtain information from the one or more messages in accordance with the application of the DPoD associated with the estimation of the PA non-linearity to the signaling, wherein the DPoD is enabled in accordance with the estimation of the PA non-linearity, and wherein the second slot is subsequent to the first slot.

12. The wireless device of claim 1, wherein the DPoD is disabled prior to the estimation of the PA non-linearity.

13. A wireless device, comprising:
a processing system that includes one or more processors and one or more memories coupled with the one or more processors, the processing system configured to cause the wireless device to:
obtain an indication of a power amplifier (PA) model change at a second wireless device;
output, during a first slot, a dedicated pilot signal associated with a dynamic power range in accordance with obtaining the indication of the PA model change, wherein the dynamic power range indicates a trigger for an estimation of a PA non-linearity; and
output, during a second slot, signaling associated with one or more messages using a PA operating point, wherein the PA operating point is associated with the dedicated pilot signal indicating the trigger for the estimation of the PA non-linearity.

14. The wireless device of claim 13, wherein the processing system is further configured to cause the wireless device to:
obtain a request for the dedicated pilot signal, wherein outputting the dedicated pilot signal is associated with obtaining the request.

15. The wireless device of claim 13, wherein, to output the signaling associated with the one or more messages, the processing system is further configured to cause the wireless device to:
output the one or more messages in accordance with a PA compression scheme, wherein the PA compression scheme is enabled in accordance with outputting the dedicated pilot signal that indicates the trigger for the estimation of the PA non-linearity, wherein the PA operating point is associated with the PA compression scheme, and wherein the second slot is subsequent to the first slot.

16. The wireless device of claim 13, wherein the processing system is further configured to cause the wireless device to:
output an indication of a set of time or frequency resources associated with the dedicated pilot signal, wherein the wireless device outputs the dedicated pilot signal via the set of time or frequency resources.

17. A method for wireless communication at a wireless device, comprising:
receiving, during a first slot, a data message associated with a dynamic power range, wherein the dynamic power range of the data message triggers an estimation of a power amplifier (PA) non-linearity using the data message in accordance with the data message spanning an entirety of the first slot; and
receiving, during a second slot, signaling associated with one or more messages, wherein the estimation of the PA non-linearity is associated with an application of digital post distortion (DPoD) to the signaling.

18. The method of claim 17, further comprising:
receiving a demodulation reference signal (DMRS) associated with a second dynamic power range, wherein the second dynamic power range is associated with a peak-to-average-power ratio (PAPR) of the DMRS, and wherein the PAPR of the DMRS triggers an estimation of a second PA non-linearity.

19. The method of claim 18, further comprising:
receiving a plurality of DMRSs across a plurality of slots, each DMRS of the plurality of DMRSs being received during a different slot, wherein the plurality of DMRSs include the DMRS and a second DMRS, and wherein the DMRS and the second DMRS are different; and
estimating the second PA non-linearity associated with the DMRS in accordance with the PAPR of the DMRS triggering the estimation of the second PA non-linearity.

20. The method of claim 19, further comprising:
refraining from estimating a third PA non-linearity using the second DMRS in accordance with the second DMRS being associated with a second PAPR that fails to trigger an estimation of the third PA non-linearity.

21. The method of claim 17, further comprising:
transmitting a request to increase to a modulation and coding scheme (MCS) associated with the one or more messages in accordance with the estimation of the PA non-linearity, wherein receiving the signaling associated with the one or more messages is in accordance with the request to increase the MCS.

22. The method of claim 17, further comprising:
receiving a dedicated pilot signal associated with an estimation of a second PA non-linearity, wherein a second dynamic power range of the dedicated pilot signal is associated with a peak-to-average-power ratio (PAPR) of the dedicated pilot signal, and wherein the PAPR of the dedicated pilot signal triggers the estimation of the second PA non-linearity.

23. The method of claim 22, further comprising:
transmitting a request for the dedicated pilot signal, wherein receiving the dedicated pilot signal is associated with transmitting the request.

24. The method of claim 22, further comprising:
transmitting an indication of a PA model change at the wireless device, wherein receiving the dedicated pilot signal is associated with transmitting the indication.

25. The method of claim 17, wherein receiving the signaling associated with the one or more messages comprises:
receiving information from the one or more messages in accordance with the application of the digital post distortion associated with the estimation of the PA non-linearity to the signaling, wherein the digital post distortion is enabled in accordance with the estimation of the PA non-linearity, and wherein the second slot is subsequent to the first slot.

26. A method for wireless communication at a wireless device, comprising:
transmitting, during a first slot, a dedicated pilot signal associated with a dynamic power range, wherein the dynamic power range indicates a trigger for an estimation of a power amplifier (PA) non-linearity; and
transmitting, during a second slot, signaling associated with one or more messages using a PA operating point that is associated with a PA compression scheme, wherein the PA operating point is associated with the dedicated pilot signal indicating the trigger for the estimation of the PA non-linearity, and wherein the PA compression scheme is enabled in accordance with transmitting the dedicated pilot signal that indicates the trigger for the estimation of the PA non-linearity.

27. The method of claim 26, further comprising:
receiving a request for the dedicated pilot signal, wherein transmitting the dedicated pilot signal is associated with receiving the request.

28. The method of claim 26, further comprising:
receiving an indication of a PA model change at a second wireless device, wherein transmitting the dedicated pilot signal is associated with receiving the indication.

29. The method of claim 26, wherein the second slot is subsequent to the first slot.

30. The method of claim 17, further comprising:
decoding the data message to obtain information conveyed via the data message;
encoding the data message as a pilot signal; and
estimating the PA non-linearity using the pilot signal in accordance with the dynamic power range, wherein the estimation of the PA non-linearity is associated with estimating the PA non-linearity using the pilot signal.

* * * * *